(12) United States Patent
Gore et al.

(10) Patent No.: US 8,027,399 B2
(45) Date of Patent: Sep. 27, 2011

(54) PILOT TRANSMISSION AND CHANNEL ESTIMATION FOR AN OFDM SYSTEM WITH EXCESS DELAY SPREAD

(75) Inventors: Dhananjay Ashok Gore, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/855,548

(22) Filed: Aug. 12, 2010

(65) Prior Publication Data

US 2010/0303165 A1    Dec. 2, 2010

Related U.S. Application Data

(63) Continuation of application No. 12/041,510, filed on Mar. 3, 2008, which is a continuation of application No. 10/821,706, filed on Apr. 9, 2004, now Pat. No. 7,339,999.

(60) Provisional application No. 60/538,210, filed on Jan. 21, 2004.

(51) Int. Cl.
*H04K 1/10* (2006.01)
*H04L 1/00* (2006.01)

(52) U.S. Cl. ........................... 375/260; 375/346

(58) Field of Classification Search .................. 375/260, 375/346
See application file for complete search history.

(56) References Cited

U.S. PATENT DOCUMENTS

| | | | |
|---|---|---|---|
| 5,303,263 A | 4/1994 | Shoji et al. | |
| 5,488,635 A | 1/1996 | Chennakeshu et al. | |
| 5,732,113 A | 3/1998 | Schmidl et al. | |
| 5,867,478 A | 2/1999 | Baum et al. | |
| 6,473,418 B1 | 10/2002 | Laroia et al. | |
| 6,654,428 B1 | 11/2003 | Bose et al. | |
| 6,654,429 B1 | 11/2003 | Li | |
| 6,654,728 B1 | 11/2003 | Li et al. | |
| 6,684,173 B2 | 1/2004 | Kessenich et al. | |
| 6,954,481 B1 | 10/2005 | Laroia et al. | |
| 7,012,882 B2 | 3/2006 | Wang et al. | |
| 7,020,226 B1 | 3/2006 | Kirkland | |

(Continued)

FOREIGN PATENT DOCUMENTS

EP    0938208    8/1999

(Continued)

OTHER PUBLICATIONS

Dukhyun Kim et al.: "Residual ISI Cancellation for OFDM with Applications to HDTV Broadcasting," Oct. 1998; XP002159671. pp. 1590-1599.

(Continued)

*Primary Examiner* — Don N Vo
(74) *Attorney, Agent, or Firm* — Stanton Braden; Peng Zhu

(57) ABSTRACT

Pilot transmission and channel estimation techniques for an OFDM system with excess delay spread are described. To mitigate the deleterious effects of excess delay spread, the number of pilot subbands is greater than the cyclic prefix length. This "oversampling" may be achieved by using more pilot subbands in each symbol period or different sets of pilot subbands in different symbol periods. In one example, a first set of pilot subands may be received in a first symbol period, and a second set of pilot subands may be received in a second symbol period. The first set of pilot subands and the second set of pilot subands may be staggered in frequency.

33 Claims, 15 Drawing Sheets

U.S. PATENT DOCUMENTS

| | | | |
|---|---|---|---|
| 7,049,404 B2 | 5/2006 | Mao et al. | |
| 7,139,331 B2 | 11/2006 | Kolze | |
| 7,180,965 B2 | 2/2007 | Eilts et al. | |
| 7,200,190 B2 | 4/2007 | Malette et al. | |
| 7,324,606 B2 | 1/2008 | Eilts et al. | |
| 7,339,999 B2 | 3/2008 | Gore et al. | |
| 7,352,821 B2 | 4/2008 | Kannan et al. | |
| 7,660,275 B2 | 2/2010 | Vijayan et al. | |
| 2005/0063298 A1 | 3/2005 | Ling et al. | |
| 2005/0135308 A1 | 6/2005 | Vijayan et al. | |
| 2005/0135509 A1 | 6/2005 | Mantravadi et al. | |
| 2005/0163258 A1 | 7/2005 | Gore et al. | |
| 2006/0269009 A1 | 11/2006 | Krishnan et al. | |
| 2008/0285670 A1 | 11/2008 | Walton et al. | |
| 2010/0215115 A1* | 8/2010 | Ketchum et al. | 375/267 |
| 2010/0246642 A1* | 9/2010 | Walton et al. | 375/146 |

FOREIGN PATENT DOCUMENTS

| | | |
|---|---|---|
| EP | 1320232 A2 | 6/2003 |
| JP | 2000068975 | 3/2000 |
| JP | 2002009724 A | 1/2002 |
| JP | 2003032217 | 1/2003 |
| JP | 2003101503 | 4/2003 |
| JP | 2003134086 A | 5/2003 |
| JP | 2004007353 A | 1/2004 |
| JP | 2004134883 A | 4/2004 |
| WO | WO9800946 | 1/1998 |

OTHER PUBLICATIONS

Hunter et al., "Channel Estimation for Mobile OFDM Systems," IEEE, Vehicular Technology Conference, 1:305-309 (Sep. 19, 1999). cited by other.

International Search Report and Written Opinion—PCT/US2004/040959, International Search Authority—European Patent Office—May 6, 1920.

Jae-Ho Ryu et al. "Comparison of Two FFT Structures for Fractionally-Spaced Frequency Domain Equalizer." VTC Spring 2002. IEEE 55th. Vehibular Technology Conference, New York, NY: IEEE, US, vol. 1 of 4. Conf. 55, May 6, 2002, pp. 1710-1713.

Mostofi, Y, et al.: "Effect of Frame Synchronization Errors on Pilot-Aided Channel Estimation in OFDM: Analysis and Solution" Wireless personal Multimedia Communications, 2002. The 5th International Symposium on Oct. 27-30, 2002, Piscataway, NJ, USA, IEEE. pp. 1309-1313.

Sandell et al., "A Comparative Study of Pilot-Based Channel Estimators for Wireless OFDM," Research Report Tulea, Division of Signal Processing, No. 19, pp. 5-34, (Sep. 1, 1996).

European Standard (Telecommunications series), "Digital Video Broadcasting (DVB); Framing structure, channel coding and modulation for digital terrestrial television", ETSI EN 300 744 v1.4.1 (Jan. 2001), section 4.5.3. cited by other.

* cited by examiner

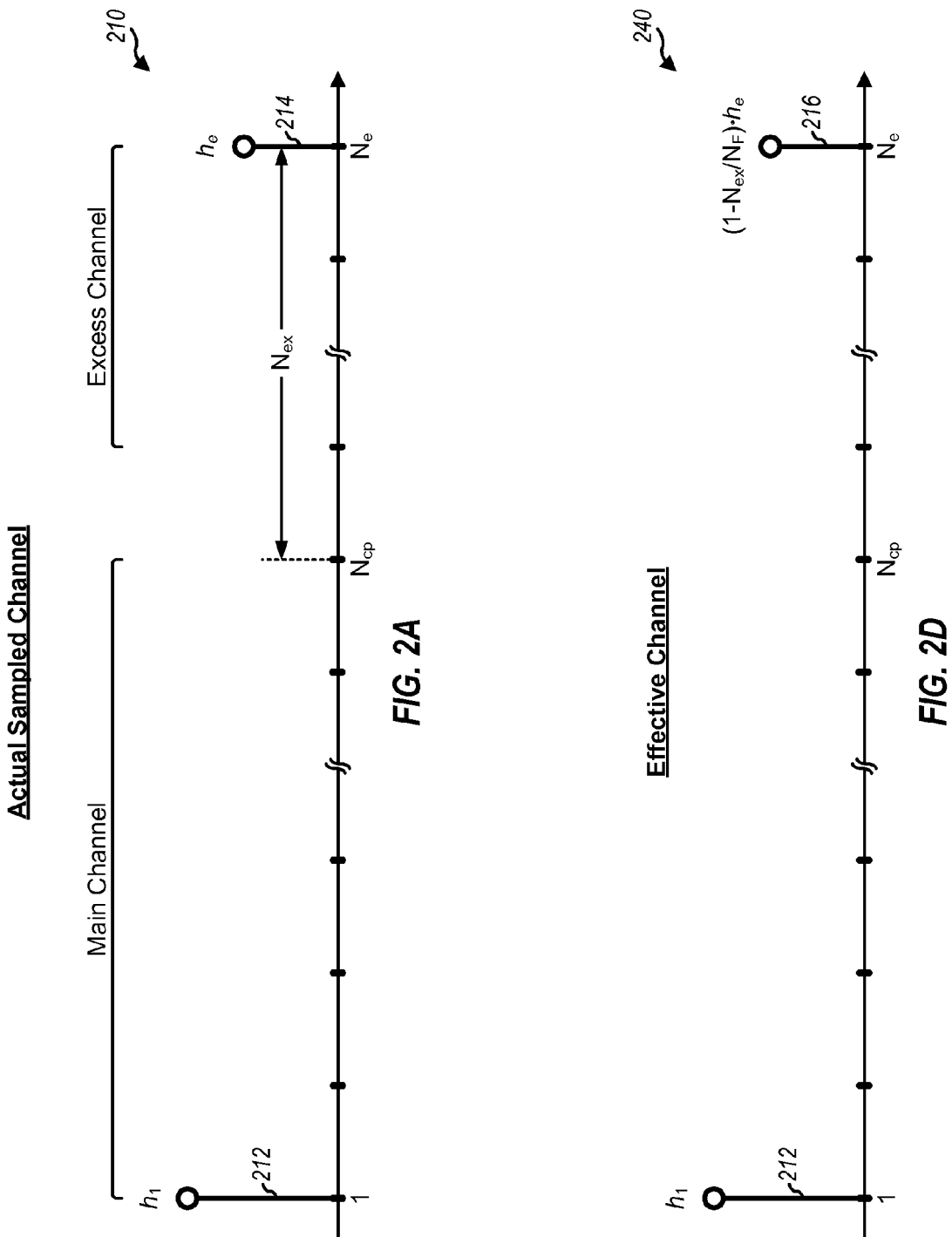

PILOT TRANSMISSION AND CHANNEL ESTIMATION FOR AN OFDM SYSTEM WITH EXCESS DELAY SPREAD

CROSS-REFERENCE TO RELATED APPLICATIONS

The present application for patent is a continuation of U.S. patent application Ser. No. 12/041,510 entitled "Pilot Transmission and Channel Estimation for an OFDM System with Excess Delay Spread" filed Mar. 3, 2008, now pending, which is a continuation of U.S. patent application Ser. No. 10/821,706 entitled "Pilot Transmission and Channel Estimation for an OFDM System with Excess Delay Spread" filed Apr. 9, 2004 now U.S. Pat. No. 7,339,999 granted Mar. 4, 2008 which claims priority to provisional application No. 60/538,210 entitled "Pilot Transmission and Channel Estimation for an OFDM System with Excess Delay Spread" filed Jan. 21, 2004, all assigned to the assignee hereof and hereby expressly incorporated by reference herein in their entirely.

FIELD

The present invention relates generally to data communication, and more specifically to pilot transmission and channel estimation for an orthogonal frequency division multiplexing (OFDM) system with excess delay spread.

BACKGROUND

OFDM is a multi-carrier modulation technique that effectively partitions the overall system bandwidth into multiple ($N_F$) orthogonal subbands. These subbands are also referred to as tones, subcarriers, bins, and frequency channels. With OFDM, each subband is associated with a respective subcarrier that may be modulated with data. Up to $N_F$ modulation symbols may be transmitted on the $N_F$ subbands in each OFDM symbol period. Prior to transmission, these modulation symbols are transformed to the time-domain using an $N_F$-point inverse fast Fourier transform (IFFT) to obtain a "transformed" symbol that contains $N_F$ chips.

OFDM can be used to combat frequency selective fading, which is characterized by different channel gains at different frequencies of the overall system bandwidth. It is well known that frequency selective fading causes intersymbol interference (ISI), which is a phenomenon whereby each symbol in a received signal acts as distortion to one or more subsequent symbols in the received signal. The ISI distortion degrades performance by impacting the ability to correctly detect the received symbols. Frequency selective fading can be conveniently combated with OFDM by repeating a portion of each transformed symbol to form a corresponding OFDM symbol. The repeated portion is commonly referred to as a cyclic prefix.

The length of the cyclic prefix (i.e., the amount to repeat for each OFDM symbol) is dependent on delay spread. The delay spread of a wireless channel is the time span or duration of an impulse response for the wireless channel. This delay spread is also the difference between the earliest and latest arriving signal instances (or multipaths) at a receiver for a signal transmitted via the wireless channel by a transmitter. The delay spread of an OFDM system is the maximum expected delay spread of the wireless channels for all transmitters and receivers in the system. To allow all receivers in the system to combat ISI, the cyclic prefix length should be equal to or longer than the maximum expected delay spread. However, since the cyclic prefix represents an overhead for each OFDM symbol, it is desirable to have the cyclic prefix length be as short as possible to minimize overhead. As a compromise, the cyclic prefix length is typically selected such that the cyclic prefix contains a significant portion of all multipath energies for most receivers in the system.

An OFDM system can withstand a delay spread that is smaller than or equal to the cyclic prefix length. When this is the case, the $N_F$ subbands are orthogonal to one another. However, a given receiver in the system may observe excess delay spread, which is a delay spread that is greater than the cyclic prefix length. Excess delay spread can cause various deleterious effects, such as ISI and channel estimation errors, both of which can degrade system performance as described below. There is therefore a need in the art for techniques to mitigate the deleterious effects of excess delay spread in an OFDM system.

SUMMARY

Techniques for transmitting pilot and estimating the response of a wireless channel with excess delay spread are described herein. To mitigate the deleterious effects of excess delay spread, the number of pilot subbands is selected to be greater than the cyclic prefix length (i.e., $N_{Peff} > N_{cp}$) to achieve "oversampling" in the frequency domain. The oversampling may be obtained by either (1) using more pilot subbands in each OFDM symbol period or (2) using different sets of pilot subbands in different OFDM symbol periods (i.e., staggered pilot subbands). For example, a staggered pilot transmission scheme may use two sets of pilot subbands, with each set containing $N_{cp}$ pilot subbands. The pilot subbands in the first set are staggered or offset from the pilot subbands in the second set.

In one exemplary channel estimation technique for the above staggered pilot transmission scheme, a first group of received pilot symbols for the first pilot subband set is obtained in a first symbol period and used to derive a first (initial) frequency response estimate for a wireless channel. A second group of received pilot symbols for the second pilot subband set is obtained in a second symbol period and used to derive a second (initial) frequency response estimate for the wireless channel. First and second channel impulse response estimates are derived based on the first and second frequency response estimates, respectively. A third (full) channel impulse response estimate is then derived based on (e.g., by repeating and either combining or filtering) the first and second channel impulse response estimates, as described below. The third channel impulse response estimate contains more taps than the number of pilot subbands in either the first or second set, which permits a more accurate characterization of the wireless channel in the presence of excess delay spread. A third (final) frequency response estimate is derived based on the third channel impulse response estimate and may be used for detection and other purposes. The channel estimation may be tailored to the specific staggered pilot transmission scheme selected for use.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIGS. 2A and 2D show a wireless channel with excess delay spread and its effective channel, respectively;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
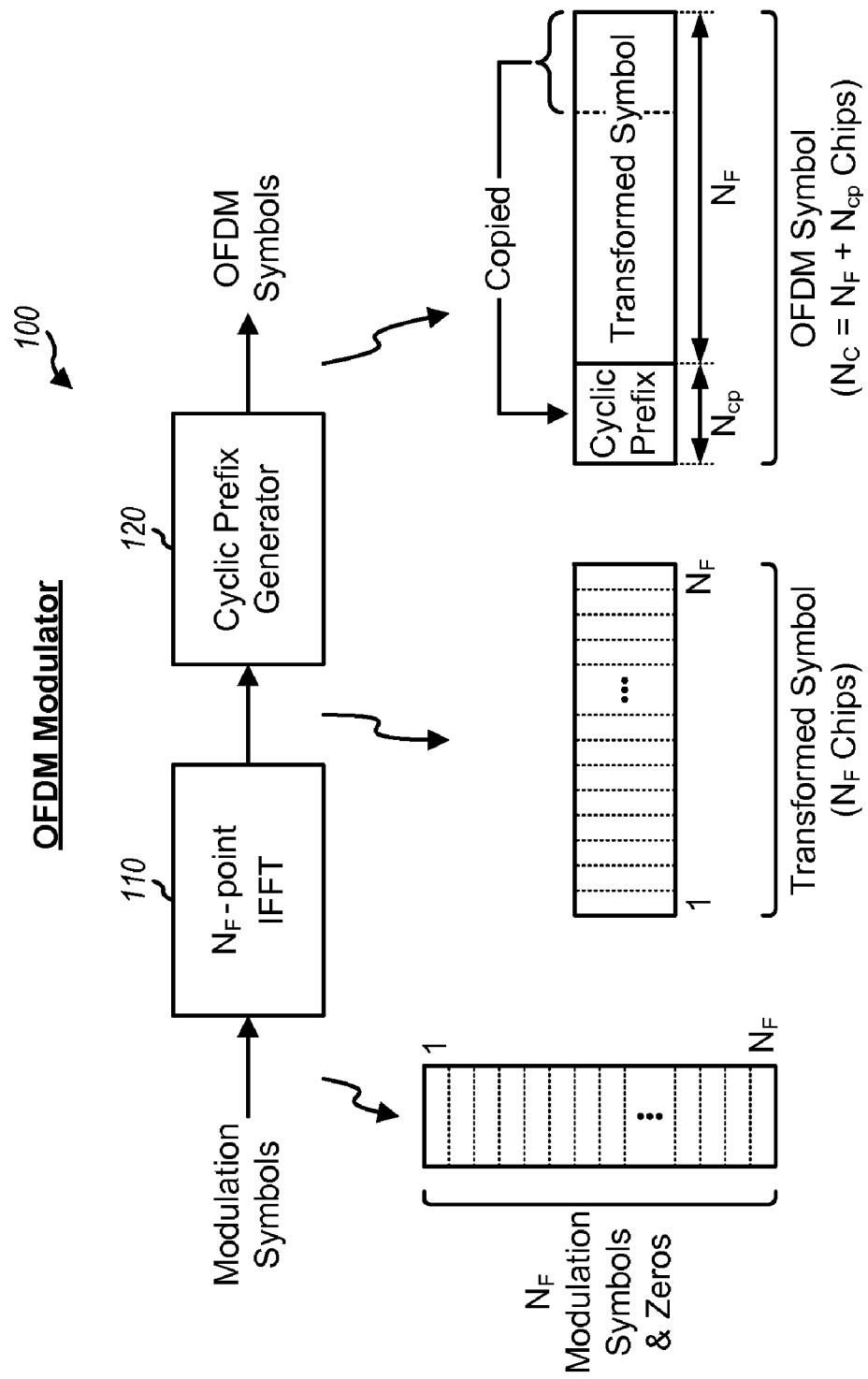
FIG. 1 shows an OFDM modulator for an OFDM system.

FIG. 1 shows a block diagram of an OFDM modulator 100 for an OFDM system. The data to be transmitted is typically encoded and interleaved to generate code bits, which are then mapped to modulation symbols. The symbol mapping is performed by (1) grouping the code bits into B-bit binary values, where $B \geq 1$, and (2) mapping each B-bit value to a specific modulation symbol based on a modulation scheme (e.g., M-PSK or M-QAM, where $M=2^B$). Each modulation symbol is a complex value in a signal constellation corresponding to the modulation scheme. For each OFDM symbol period, one "transmit" symbol is sent on each of the $N_F$ subbands. Each transmit symbol can be either a modulation symbol for pilot/data or a signal value of zero (i.e., a "zero symbol"). An IFFT unit 110 performs an $N_F$-point IFFT on the $N_F$ transmit symbols for the $N_F$ total subbands in each OFDM symbol period and provides a transformed symbol that contains $N_F$ chips. The IFFT may be expressed as:

$$\underline{s} = \underline{W}_{N_F \times N_F}^H \underline{S}, \quad \text{Eq (1)}$$

where $\underline{S}$ is an $N_F \times 1$ vector of transmit symbols for the $N_F$ subbands;

$\underline{W}_{N_F \times N_F}$ is an $N_F \times N_F$ discrete Fourier transform (DFT) matrix;

$\underline{s}$ is an $N_F \times 1$ vector of time-domain chips; and

"$H$" denotes the conjugate transpose.

The DFT matrix $\underline{W}_{N_F \times N_F}$ is defined such that the (n,m)-th entry, $w_{n,m}$, is given as:

$$w_{n,m} = e^{-j2\pi \frac{(n-1)(m-1)}{N_F}}, \quad \text{Eq (2)}$$

for $n = \{1 \ldots N_F\}$ and $m = \{1 \ldots N_F\}$, where n is a row index and m is a column index. $\underline{W}_{N_F \times N_F}^H$ is an inverse DFT matrix.

A cyclic prefix generator 120 repeats a portion of each transformed symbol to obtain a corresponding OFDM symbol that contains $N_C$ chips, where $N_C = N_F + N_{cp}$ and $N_{cp}$ is the cyclic prefix length. An OFDM symbol period is the duration of one OFDM symbol, which is $N_C$ chip periods. The chips are conditioned and transmitted via a wireless channel.

FIG. 2A shows an exemplary impulse response 210 of a wireless channel with excess delay spread. Channel impulse response 210 includes two taps 212 and 214 for two multi-paths in the wireless channel. Tap 212 has a complex gain of $h_1$ and is located at tap index 1. Tap 214 has a complex gain of $h_e$ and is located at tap index $N_e$, which is outside of the cyclic prefix length $N_{cp}$. As used herein, "main channel" refers to the portion of the channel impulse response that is at or within the cyclic prefix length, "excess channel" refers to the portion of the channel impulse response that is outside of the cyclic prefix length, and "excess" refers to the difference between the tap index of an excess channel tap and the cyclic prefix length. For channel impulse response 210, the main channel includes one tap 212, the excess channel includes one tap 214, and the excess for tap 214 is $N_{ex} = N_e - N_{cp}$.

Figure 2B:
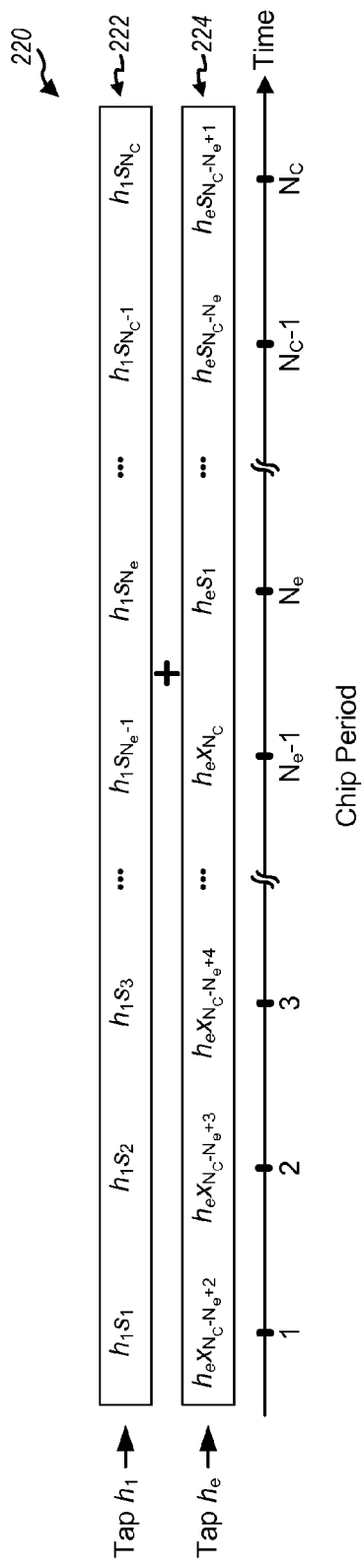
FIGS. 2B and 2C show a sequence of received chips for the wireless channel.

FIG. 2B shows a sequence 220 of received chips for the wireless channel shown in FIG. 2A. Received chip sequence 220 is a convolution of a transmitted chip sequence with taps 212 and 214 for the wireless channel. Received chip sequence 220 is composed of (1) a chip sequence 222 generated by convolving main channel tap 212 with the transmitted chip sequence and (2) a chip sequence 224 generated by convolving excess channel tap 214 with the transmitted chip sequence, where $s_i$ denotes the i-th chip for the current OFDM symbol, $x_i$ denotes the i-th chip for the previous OFDM symbol, and $i=1 \ldots N_C$.

Figure 2C:
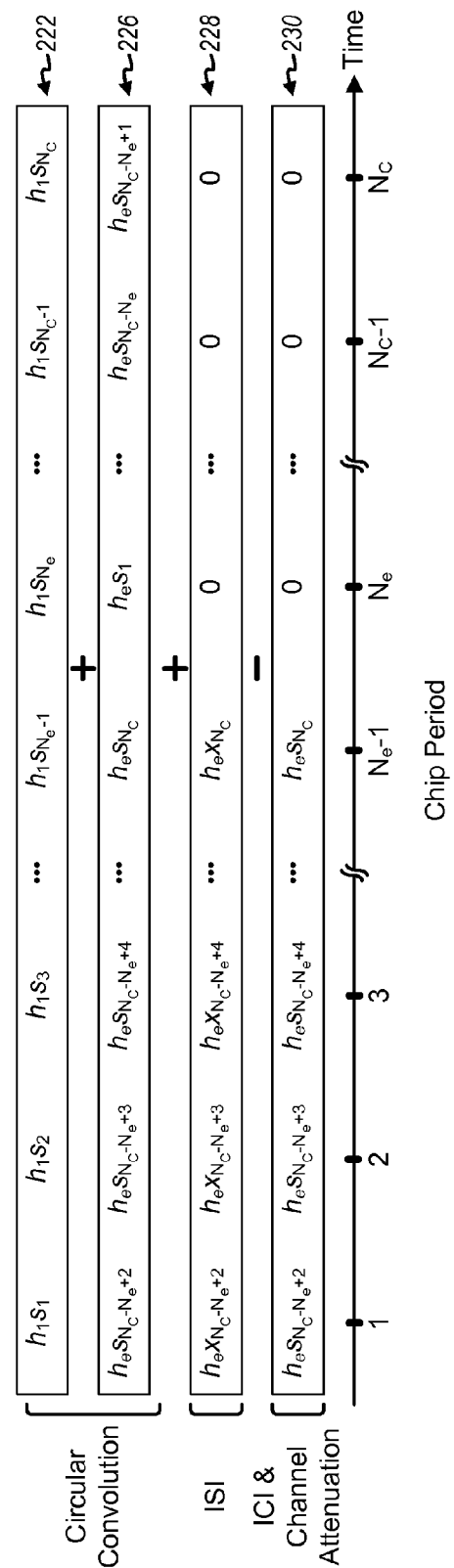

FIG. 2C shows the decomposition of received chip sequence 220 into different components. Chip sequence 224 in FIG. 2B is replaced with (1) a chip sequence 226 generated by a circular convolution of excess channel tap 214 with the $N_C$ chips for the current OFDM symbol, (2) a chip sequence 228 for the tail end of the previous OFDM symbol, and (3) a chip sequence 230 for the tail end of the current OFDM symbol. Chip sequences 222 and 226 represent the sequences that would have been received for taps 212 and 214 if the cyclic prefix length were sufficiently long and tap 214 is part of the main channel. However, since this is not the case, chip sequences 228 and 230 are both due to the excess delay spread. Chip sequence 228 represents the leakage of the previous OFDM symbol into the current OFDM symbol and is the source of intersymbol interference. Chip sequence 230 represents the disturbance to the circular convolution and is the source of intercarrier interference (ICI) and channel attenuation.

The intersymbol interference observed in each subband may be expressed as:

$$ISI(k) = h_e \cdot \underline{W}_{1 \times N_{ex}}(k) \underline{W}_{N_{ex} \times N_F}^H \underline{X}, \text{ for } k=1 \ldots N_F, \quad \text{Eq (3)}$$

where $\underline{X}$ is an $N_F \times 1$ vector of transmit symbols for the previous OFDM symbol;

$\underline{W}_{N_{ex} \times N_F}^H$ is an $N_{ex} \times N_F$ matrix with the last $N_{ex}$ rows of $\underline{W}_{N_F \times N_F}^H$; and $\underline{W}_{1 \times N_{ex}}(k)$ is a $1 \times N_{ex}$ vector with the first $N_{ex}$ elements of the k-th row of $\underline{W}_{N_F \times N_F}$.

The operation $\underline{W}_{N_{ex} \times N_F}^H \underline{X}$ generates an $N_{ex} \times 1$ vector $\underline{X}_{N_{ex}}$ that contains the last $N_{ex}$ chips of the previous OFDM symbol. The multiplication of $\underline{X}_{N_{ex}}$ with $\underline{W}_{1 \times N_{ex}}(k)$ generates the interference due to these last $N_{ex}$ chips on subband k.

The noise power on each subband due to intersymbol interference can be expressed as:

$$\sigma_{ISI}^2 = E_S \cdot |h_e|^2 \cdot (N_{ex}/N_F), \text{ for } k=1 \ldots N_F, \quad \text{Eq (4)}$$

where $E_S$ is the transmit symbol energy, $|h_e|^2$ is the power of the excess channel, and $\sigma_{ISI}^2$ is the noise power due to ISI on each subband. As shown in equation (4), the ISI noise power per subband is (1) proportional to the excess channel energy $|h_e|^2$, (2) proportional to the excess $N_{ex}$, which is indicative of the amount of leakage of the previous OFDM symbol onto the current OFDM symbol, and (3) inversely related to the number of total subbands since the total ISI noise power is distributed over the $N_F$ subbands.

The noise power on each subband due to intercarrier interference can be computed in similar manner as for intersymbol interference and expressed as:

$$\sigma_{ICI}^2 = E_S \cdot |h_e|^2 \cdot [(N_{ex}/N_F) - (N_{ex}/N_F)^2], \text{ for } k=1 \ldots N_F, \quad \text{Eq (5)}$$

where $\sigma_{ICI}^2$ is the noise power due to ICI on each subband.

FIG. 2D shows an "effective" channel 240 for the wireless channel shown in FIG. 2A. Referring back to FIG. 2C, chip sequence 226 represents the contribution due to excess channel tap 214 (assuming that the cyclic prefix is long enough), and chip sequence 230 represents the source of ICI due to the excess channel. The subtraction operation for chip sequence 230 results partly in a reduction of the signal power for each subband. This subtraction can be accounted for by scaling down excess channel tap 214 by a factor of $(1-N_{ex}/N_F)$. As shown in FIG. 2D, effective channel 240 includes tap 212 having the complex gain of $h_1$ and a tap 216 having a complex gain of $h_e \cdot (1-N_{ex}/N_F)$. The reduction in the gain of tap 216 relative to the gain of tap 214 is referred to as "channel attenuation" and results from excess delay spread for tap 214. The amount of attenuation is related to the excess $N_{ex}$.

A receiver performs channel estimation in order to derive a channel estimate for the wireless channel. Channel estimation is typically performed based on pilot symbols, which are modulation symbols that are known a priori by the receiver. The pilot symbols may be transmitted in various manners as described below.

Figure 3:
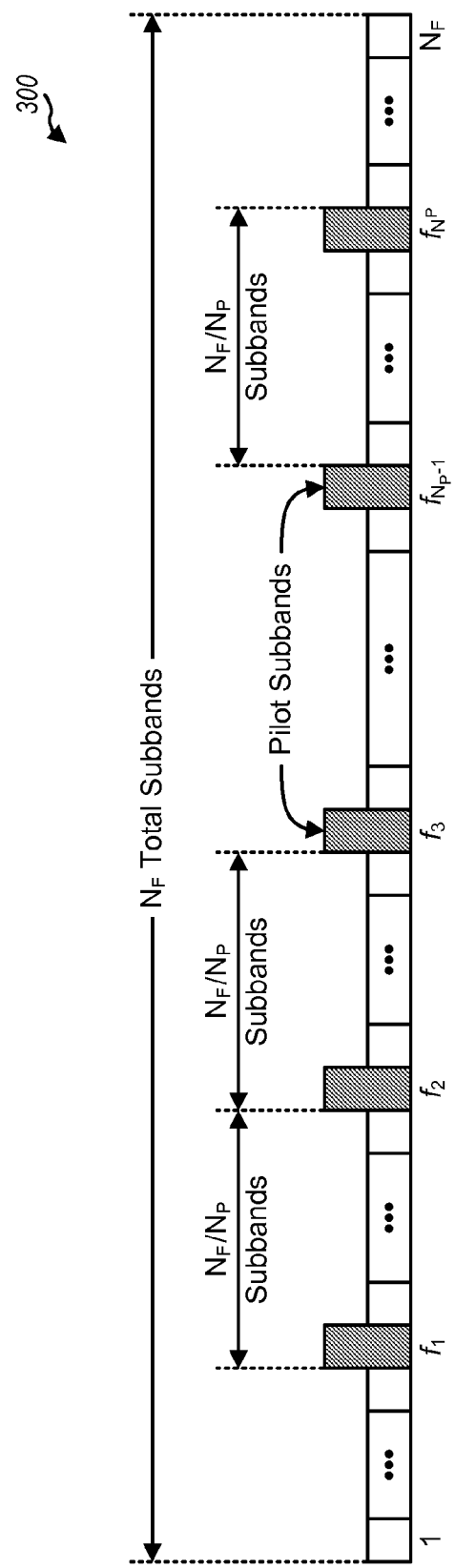
FIG. 3 shows a subband structure that may be used for the OFDM system.

FIG. 3 shows an exemplary subband structure that may be used for the OFDM system. The OFDM system has an overall system bandwidth of BW MHz, which is partitioned into $N_F$ orthogonal subbands using OFDM. Each subband has a bandwidth of BW/$N_F$ MHz. For a spectrally shaped OFDM system, only $N_U$ of the $N_F$ total subbands are used for data/pilot transmission, where $N_U < N_F$, and the remaining $N_F - N_U$ subbands are not used for data/pilot transmission and serve as guard subbands to allow the system to meet spectral mask requirements. For simplicity, the following description assumes that all $N_F$ subbands may be used in the OFDM system.

FIG. 3 also shows an exemplary frequency division multiplex (FDM) pilot transmission scheme 300. $N_P$ subbands are used for pilot transmission and are referred to as "pilot subbands". To simplify computation for the channel estimate, $N_P$ may be selected as a power of two, and the $N_P$ pilot subbands may be uniformly distributed across the $N_F$ total subbands such that consecutive pilot subbands are spaced apart by $N_F/N_P$ subbands.

The receiver can derive an initial frequency response estimate of the wireless channel based on received pilot symbols for the pilot subbands, as follows:

$$\hat{H}_p(k) = \frac{y_p(k)}{p(k)}, \text{ for } k \in K_p, \quad \text{Eq (6)}$$

where
$y_p(k)$ is a received pilot symbol for subband k;
$p(k)$ is a pilot symbol transmitted on subband k;
$\hat{H}_p(k)$ is a channel gain estimate for pilot subband k; and
$K_p$ is a set of pilot subbands.

An $N_P \times 1$ vector $\underline{\hat{H}}_p$ for the initial frequency response estimate for $N_P$ uniformly distributed pilot subbands may be formed as $\underline{\hat{H}}_p = [\hat{H}_p(1) \, \hat{H}_p(2) \ldots \hat{H}_p(N_P)]^T$, where "T" denotes the transpose. If pilot symbols are not transmitted on any one of the $N_P$ pilot subbands (e.g., for a spectrally shaped OFDM system), then extrapolation and/or interpolation may be performed as necessary to obtain channel gain estimates for pilot subbands without pilot transmission. Filtering may also be performed on the vectors $\underline{\hat{H}}_p$, obtained for different OFDM symbol periods to improve the quality of the initial frequency response estimate.

The frequency response estimate for the $N_F$ total subbands may be obtained based on the initial frequency response estimate $\underline{\hat{H}}_p$ using various techniques. For a least-squares channel estimation technique, a least-squares impulse response estimate for the wireless channel is first obtained as follows:

$$\underline{\hat{h}}_{N_P} = \underline{W}_{N_P \times N_P}^H \underline{\hat{H}}_p, \quad \text{Eq (7)}$$

where
$\underline{W}_{N_P \times N_P}$ is an $N_P \times N_P$ DFT matrix for the $N_P$ pilot subbands; and
$\underline{\hat{h}}_{N_P}$ is an $N_P \times 1$ vector for the least-squares impulse response estimate.

Equation (7) indicates that the maximum number of channel taps that can be estimated is limited to the number of pilot subbands (i.e., $N_{tap} = N_P$).

The vector $\underline{\hat{h}}_{N_P}$ can be post-processed, for example, by setting taps with values less than a predetermined threshold to zero, setting taps for the excess channel to zero, and so on, as described below. The vector $\underline{\hat{h}}_{N_P}$ is then zero-padded to length $N_F$. The zero-padded vector $\underline{\hat{h}}_{N_F}$ is transformed with an $N_F$-point FFT to obtain a vector $\underline{\hat{H}}_{N_F}$ for the final frequency response estimate, as follows:

$$\underline{\hat{H}}_{N_F} = \underline{W}_{N_P \times N_F} \underline{\hat{h}}_{N_F}, \quad \text{Eq (8)}$$

where
$\underline{\hat{H}}_{N_F} = [\hat{H}(1) \, \hat{H}(2) \ldots \hat{H}(N_F)]^T$.

Figure 4A:
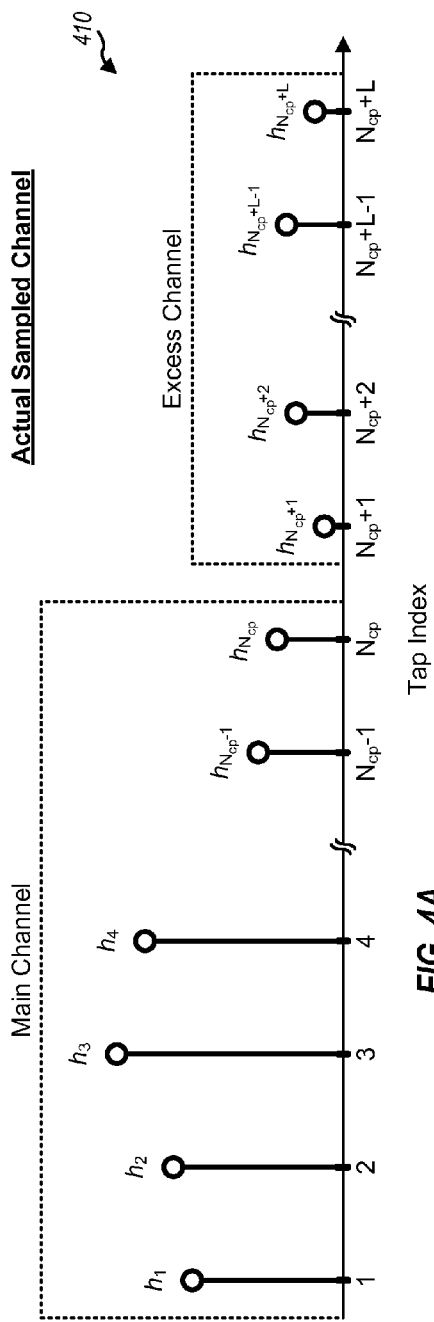
FIGS. 4A, 4B and 4C show a sampled channel for a wireless channel, its effective channel, and its estimated channel with critical sampling, respectively.

FIG. 4A shows a generic impulse response 410 for a wireless channel. Channel impulse response 410 includes (1) $N_{cp}$ taps with indices of 1 through $N_{cp}$ for the main channel and (2) L taps with indices of $N_{cp}+1$ through $N_{cp}+L$ for the excess channel. L is the time span or length of the excess channel and is greater than zero when excess delay spread is present. Each tap has a complex gain of $h_i$, which in general may be a non-zero or zero value.

Figure 4B:
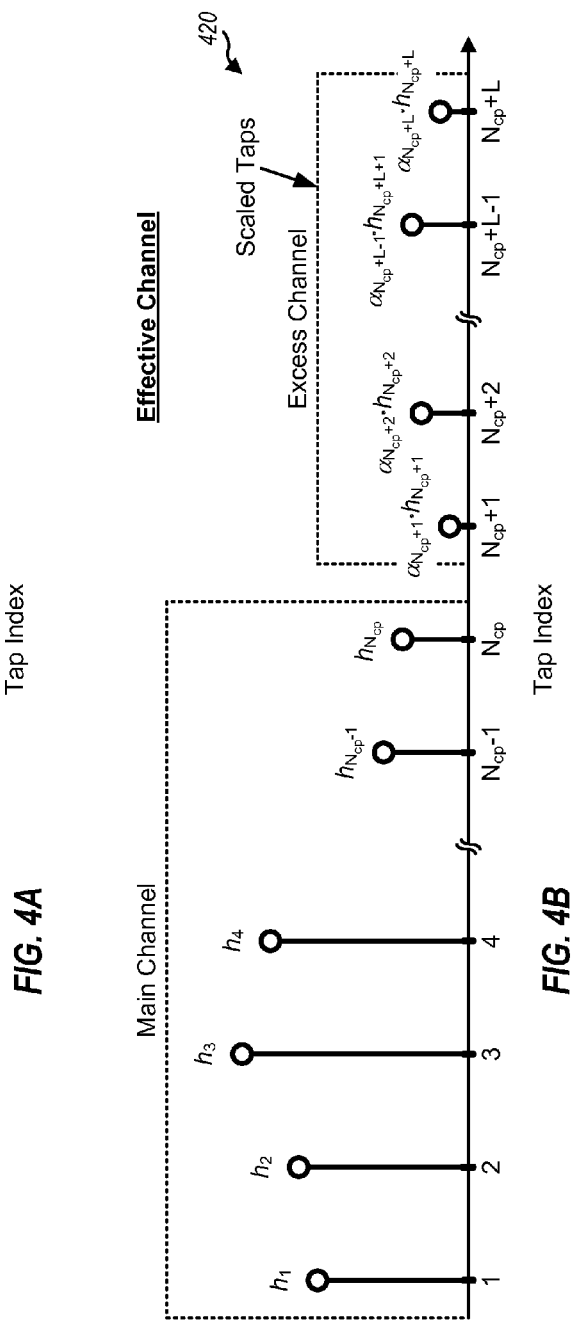

FIG. 4B shows an impulse response 420 for an effective channel for the wireless channel in FIG. 4A. Channel impulse response 420 includes all of the taps of channel impulse response 410. However, each of the L taps for the excess channel is scaled by a scaling factor of $\alpha_{N_i} = (1 - N_i/N_F)$, where $N_i$ is the excess for the tap and $N_i = 1 \ldots L$. The time span of the effective channel is equal to the time span of the wireless channel and is greater than the cyclic prefix length in the presence of excess delay spread. The frequency response for the wireless channel can be obtained by performing an FFT on impulse response 420 for the effective channel.

The channel impulse response for the effective channel can be estimated based on the received pilot symbols, as shown in equations (6) and (7). The accuracy of the channel impulse response estimate is impacted by the number of pilot subbands.

For a critically-sampled OFDM system, the number of pilot subbands is equal to the cyclic prefix length (i.e., $N_P=N_{cp}$). Since the number of pilot subbands determines the maximum time span that can be estimated for the channel impulse response, up to $N_{cp}$ channel taps for indices of 1 through $N_{cp}$ can be estimated for the critically-sampled system.

Figure 4C:
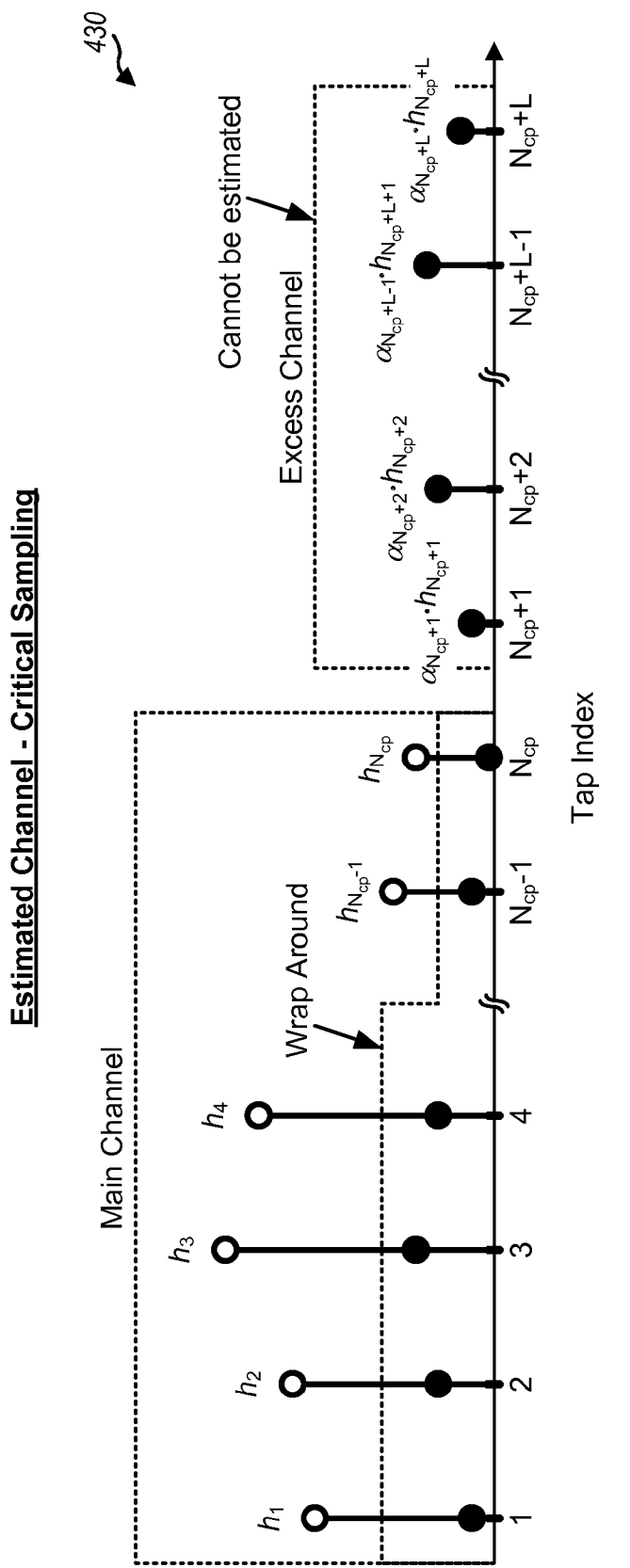

FIG. 4C shows an impulse response 430 for an estimated channel for the critically-sampled OFDM system with excess delay spread. The time span of the effective channel is longer than the cyclic prefix length when excess delay spread is present. In this case, the excess channel taps at indices of $N_{cp}+1$ through $N_{cp}+L$ cannot be estimated because an insufficient number of degrees of freedom exists for the critically-sampled OFDM system. Furthermore, the channel impulse response for the wireless channel is undersampled in the frequency domain by the $N_P$ pilot subbands. This then causes a wrap around effect of the excess channel in the time domain so that the excess channel tap at index $N_{cp}+1$ appears at index 1, the excess channel tap at index $N_{cp}+2$ appears at index 2, and so on. Each wrap around excess channel tap causes an error in estimating the corresponding main channel tap.

If an FFT is performed on channel impulse response 430, then the resultant frequency response estimate for each subband can be expressed as:

$$\hat{H}_{cs}(k) = H(k) + H_{err}(k), \text{ for } k=1 \ldots N_F, \quad \text{Eq (9)}$$

where $H(k)$ is the actual channel gain for subband k;

$\hat{H}_{cs}(k)$ is the channel gain estimate for subband k with critical sampling; and $H_{err}(k)$ is the error in the channel gain estimate for subband k.

For simplicity, channel gain error due to other noise is not shown in equation (9).

The channel gain error $H_{err}(k)$ can be expressed as:

$$H_{err}(k) = 2e^{j\pi\left(\frac{N_{cp}k}{N_F}+\frac{1}{2}\right)} \cdot \sin\left(\frac{\pi \cdot N_{cp} \cdot k}{N_F}\right) \cdot H_{ex}(k), \quad \text{Eq (10)}$$

for $k = 1 \ldots N_F$, where $H_{ex}(k)$ is the complex gain for subband k due to the excess channel, which can be obtained by performing an FFT on the excess channel taps. The channel gain error $H_{err}(k)$ can be decomposed into four parts. The factor of 2 immediately to the right of the equal sign in equation (10) reflects the two sources of channel gain error: (1) the inability to sample the excess channel and (2) the wrap around of the excess channel onto the main channel The sine term corresponds to a sinusoidal having a frequency determined by the ratio of $N_{cp}$ over $N_F$. The total noise power for the channel gain errors for all subbands may be expressed as:

$$\sigma_{ch}^2(k) = \sum_{k=1}^{N_F} |H_{err}(k)|^2 \quad \text{Eq (11)}$$
$$= 2 \cdot \sum_{k=1}^{N_F} |H_{ex}(k)|^2 \cdot \left(1 - \cos\left(\frac{\pi \cdot N_{cp} \cdot k}{N_F}\right)\right),$$

for $k = 1 \ldots N_F$.

The signal-to-noise-and-interference ratio (SNR) for each subband may be expressed as:

$$SNR(k) = \frac{E_S \cdot \|h\|^2}{N_0 + E_S \cdot [\sigma_{ch}^2(k) + \sigma_{ISI}^2(k) + \sigma_{ICI}^2(k)]}, \quad \text{Eq (12)}$$

where $N_0$ is the channel noise (which includes thermal noise, interference from other sources, receiver noise, and so on) and $\|h\|^2$ is the 2-norm of the effective channel impulse response. As shown in equation (12), the channel estimation error, ISI, and ICI noise powers are all scaled by the signal power $E_S$. These three noise terms thus manifest as a noise floor for the SNR. The noise floor due to channel estimation error, ISI, and ICI noise powers may be neglected if they are lower than the channel noise $N_0$. However, this noise floor may limit the performance of the system if these noise powers are higher than the channel noise $N_0$. The channel estimation error noise power may dominate the ISI and ICI noise powers if the excess channel taps contain a significant portion (e.g., 10% or more) of the total channel energy.

To mitigate the deleterious effects of excess delay spread on channel estimation error and SNR, the number of pilot subbands may be increased. For an over-sampled OFDM system, the "effective" number of pilot subbands (which is the number of different pilot subbands used for channel estimation) is greater than the cyclic prefix length (i.e., $N_{Peff}>N_{cp}$). If $N_{Peff}$ is sufficiently large so that the impulse response of the wireless channel (including the excess channel) does not exceed $N_{Peff}$ taps, then a sufficient number of degrees of freedom is available to estimate all of the taps for the wireless channel in the presence of excess delay spread.

Additional pilot subbands for oversampling may be obtained by various means. In one pilot transmission scheme, $N_{Peff}=N_P>N_{cp}$ and pilot symbols are transmitted on all $N_P$ pilot subbands in each OFDM symbol period. To simplify computation, $N_P$ may be selected to be a power of two (e.g., $N_P=2N_{cp}$) and the $N_P$ pilot subbands may be uniformly distributed across the $N_F$ total subbands. Fewer subbands would be available for data transmission for this pilot transmission scheme.

Figure 5:
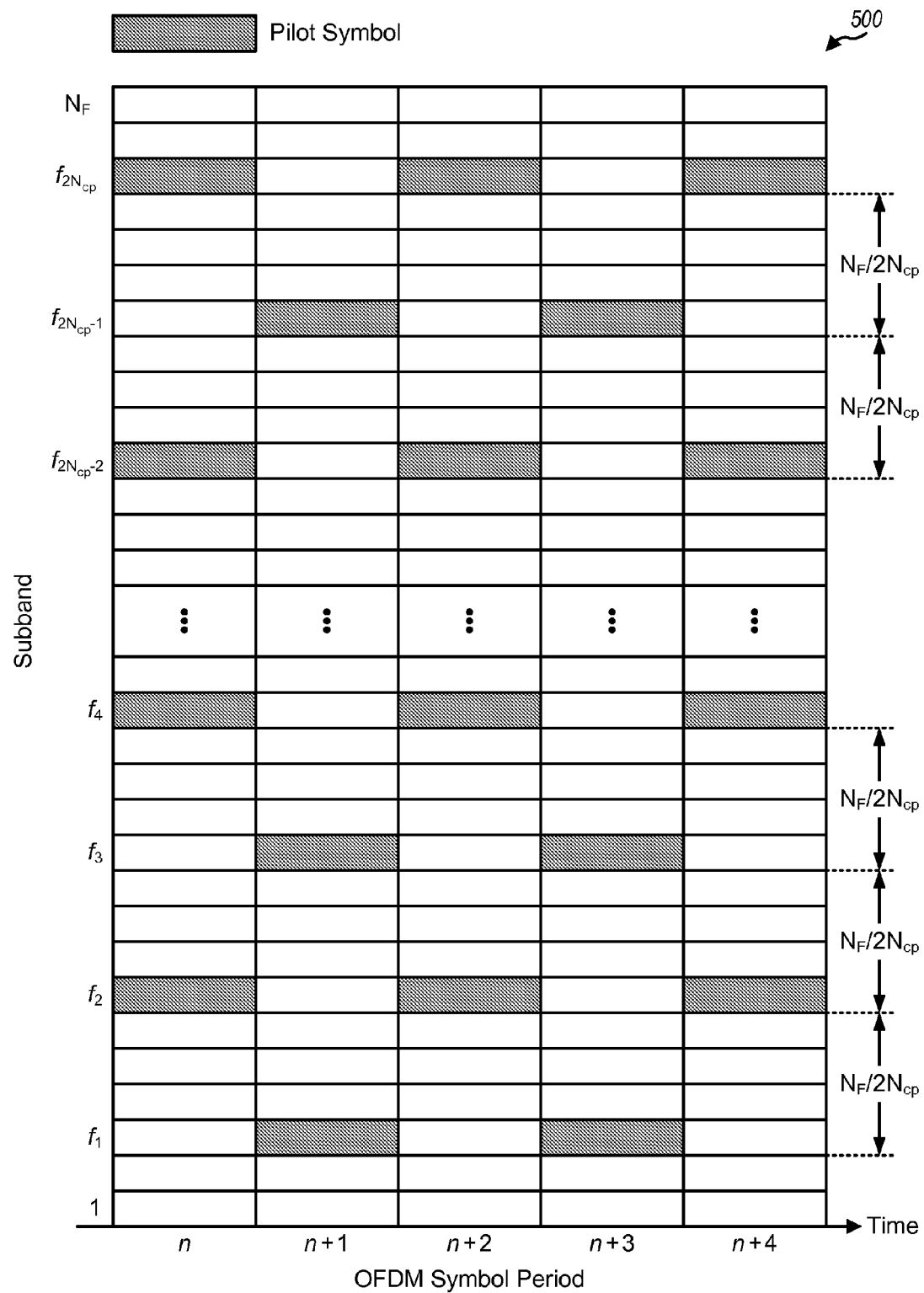
FIGS. 5, 9A and 9B show three staggered pilot transmission schemes.

FIG. 5 shows a staggered pilot transmission scheme 500 that may be used to increase the effective number of pilot subbands without increasing pilot overhead. For scheme 500, $N_P=N_{cp}$ pilot subbands are used for each OFDM symbol period. However, the $N_{cp}$ pilot subbands for odd OFDM symbol periods are staggered or offset from the $N_{cp}$ pilot subbands for even OFDM symbol periods by $N_F/2N_{cp}$ subbands. Scheme 500 uses two different sets of $N_{cp}$ pilot subbands, which corresponds to a repetition factor of two. The effective number of pilot subbands is thus $N_{Peff}=2N_P=2N_{cp}$. To simplify computation, the $N_{cp}$ pilot subbands for each OFDM symbol may be uniformly distributed across the $N_F$ total subbands.

Figure 6:
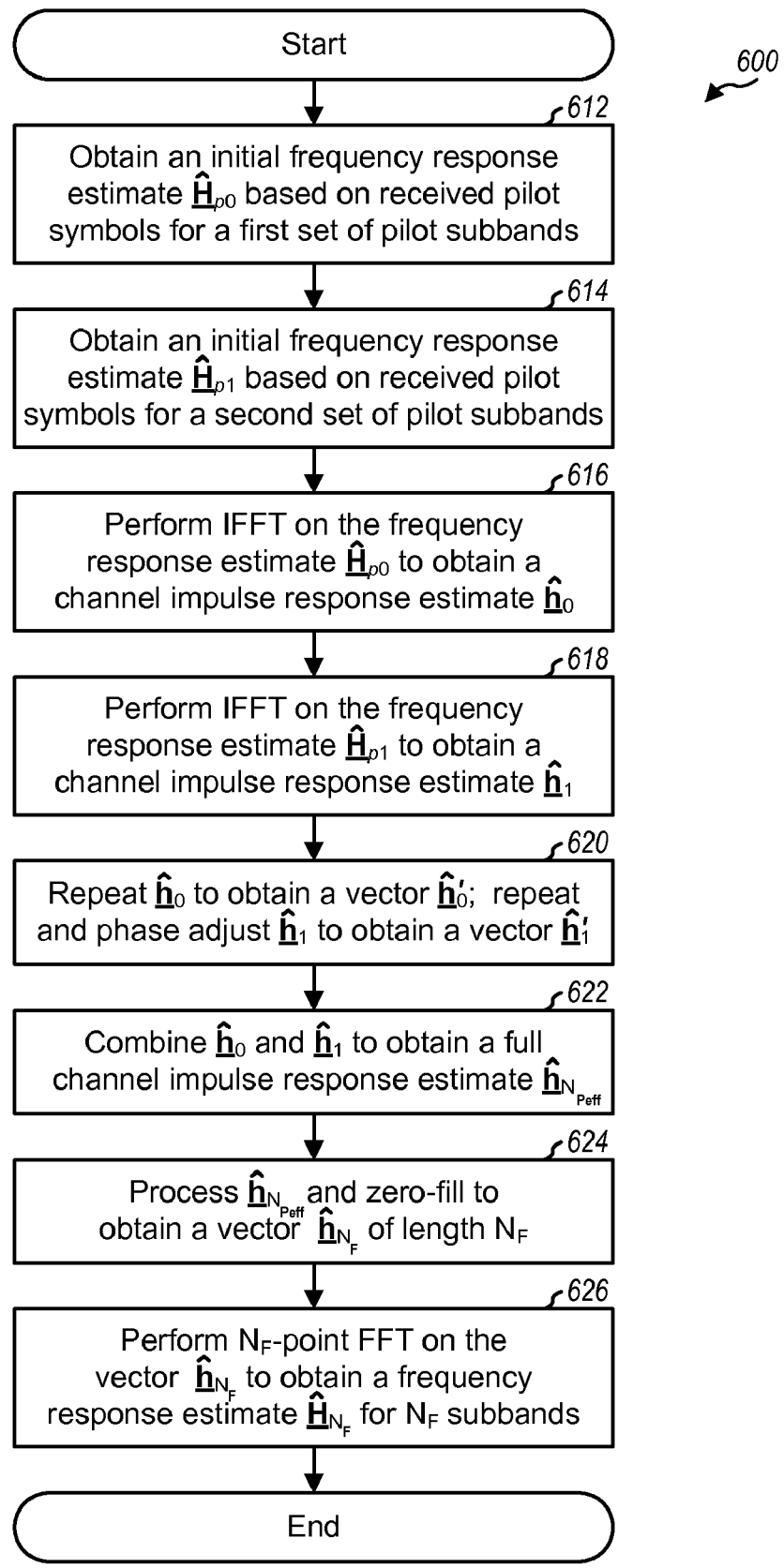
FIG. 6 shows a process for deriving a full channel impulse response estimate based on the staggered pilot transmission scheme shown in FIG. 5.

FIG. 6 shows a process 600 for deriving a full channel impulse response estimate of length $N_{Peff}=2N_{cp}$ for a wireless channel based on pilot transmission scheme 500. An initial frequency response estimate $\hat{H}_{p0}$ is obtained based on received pilot symbols for the first set of $N_{cp}$ pilot subbands used in OFDM symbol period n, as shown in equation (6) (block 612). An initial frequency response estimate $\hat{H}_{p1}$ is also obtained based on received pilot symbols for the second set of $N_{cp}$ pilot subbands used in OFDM symbol period n+1 (block 614). An $N_{cp}$-point IFFT is performed on $\hat{H}_{p0}$ to obtain a channel impulse response estimate $\hat{h}_0$ with $N_{cp}$ taps (block 616). An $N_{cp}$-point IFFT is also performed on $\hat{H}_{p1}$ to obtain another channel impulse response estimate $\hat{h}_1$ with $N_{cp}$ taps (block 618). For scheme 500 with a repetition of two, the vector $\hat{h}_0$ is repeated to obtain a vector $\hat{h}'_0$ of length $N_{Peff}=2N_{cp}$ (block 620). The vector $\hat{h}_1$ is also repeated but further phase adjusted to obtain a vector $\hat{h}'_1$ of length $N_{Peff}$ (also block 620). The vectors $\hat{h}'_0$ and $\hat{h}'_1$ are then combined (e.g., filtered) to obtain a full channel impulse response estimate $\hat{h}_{N_{Peff}}$ with $N_{Peff}$ taps (block 622). The vector $\hat{h}_{N_{Peff}}$ may be further processed (e.g., to suppress noise) and is zero-filled to obtain a vector $\hat{h}_{N_F}$ of length $N_F$ (block 624). An $N_F$-point FFT is then performed on the vector $\hat{h}_{N_F}$ to obtain the final frequency response estimate $\hat{H}_{N_F}$ for the $N_F$ subbands, as shown in equation (8) (block 626).

FIG. 6 shows an embodiment whereby the channel estimates for the two sets of pilot subbands are combined in the time domain. This is achieved by (1) deriving an initial channel impulse response estimate for the initial frequency response estimate for each set of pilot subbands (blocks 616 and 618) and (2) combining the initial channel impulse response estimates for the two sets of pilot subbands to obtain the full channel impulse response estimate (block 622). The initial frequency channel response estimates for the two sets of pilot subbands may also be combined in the frequency domain to obtain an intermediate frequency response estimate, which may then be used to derive the full channel impulse response estimate.

Figure 7:
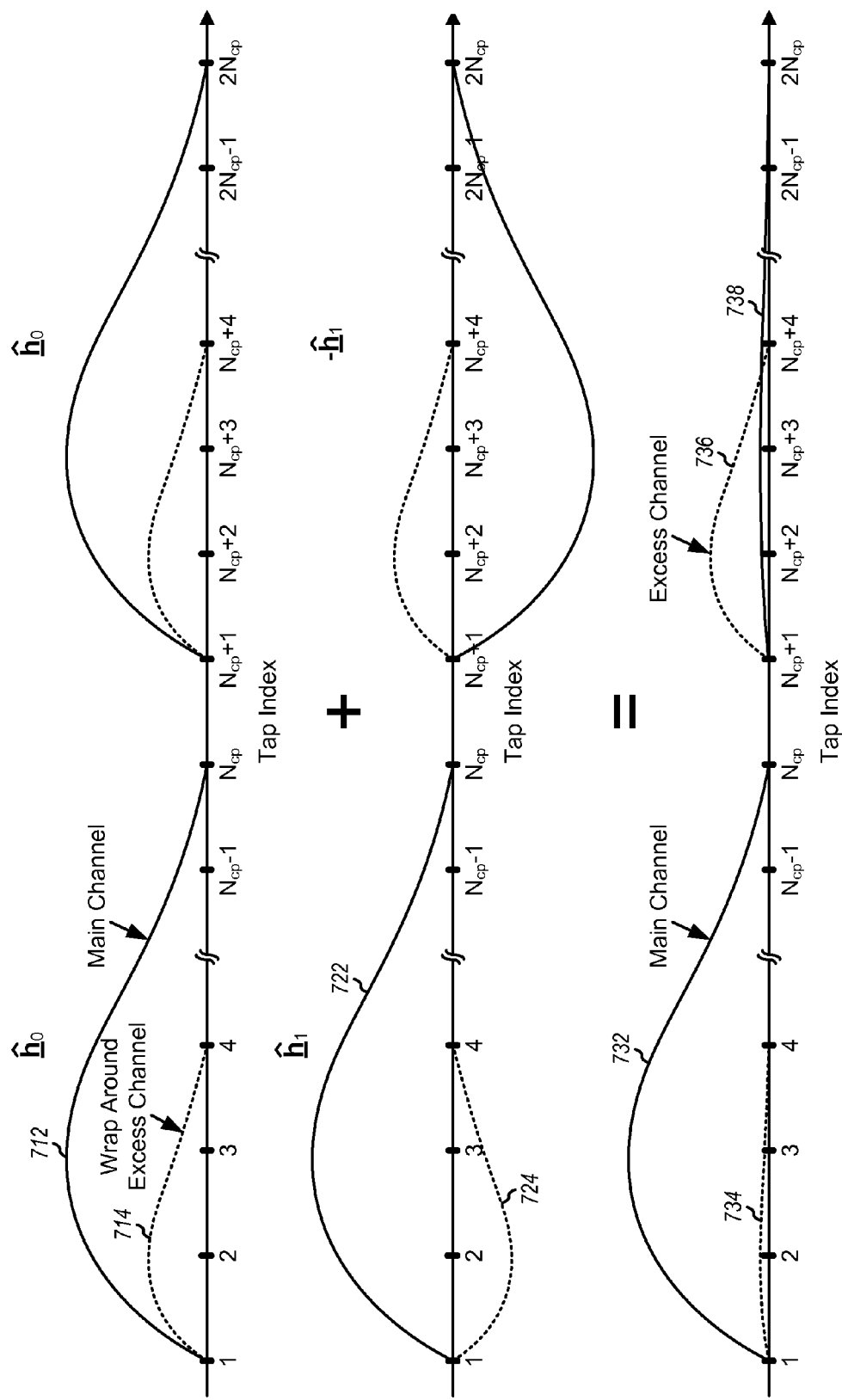
FIG. 7 shows the derivation of the full channel impulse response estimate.

FIG. 7 illustrates the derivation of the full channel impulse response estimate $\hat{h}_{N_{Peff}}$ with $N_{Peff}=2N_{cp}$ taps based on staggered pilot transmission scheme 500. The vector $\hat{h}_0$ represents a channel impulse response estimate with $N_{cp}$ taps and includes (1) a response 712 for the main channel and (2) a response 714 for the wrap around excess channel, which is caused by undersampling in the frequency domain with $N_{cp}$ pilot subbands. The vector $\hat{h}_0$ is repeated to obtain a vector $\hat{h}'_0 = [\hat{h}_0 \ \hat{h}_0]^T$. The vector $\hat{h}_1$ similarly includes a response 722 for the main channel and a response 724 for the wrap around excess channel. The vector $\hat{h}_1$ is also repeated, with the repeated instance being inverted, to obtain a vector $\hat{h}'_1 = [\hat{h}_1 \ -\hat{h}_1]^T$. The vector $\hat{h}_{N_{Peff}}$ may be obtained by summing the vectors $\hat{h}'_0$ and $\hat{h}'_1$, as shown in FIG. 7. The vector $\hat{h}_{N_{Peff}}$ may also be obtained by filtering the vectors $\hat{h}'_0$ and $\hat{h}'_1$, as described below.

The vector $\hat{h}_{N_{Peff}}$ represents the full channel impulse response estimate with $N_{Peff}=2 \cdot N_{cp}$ taps and includes (1) a response 732 for the main channel, (2) a response 734 for the uncanceled portion of the wrap around excess channel, (3) a response 736 for the excess channel, and (4) a response 738 for the uncanceled portion of the main channel. Responses 734 and 738 may be due to various factors such as, for example, changes in the wireless channel between the times that the vectors $\hat{h}_0$ and $\hat{h}_1$ are obtained.

As shown in FIG. 7, the full channel impulse response (with $N_{Peff}$ taps) of the wireless channel can be estimated based on two received OFDM symbols each containing $N_{cp}$ pilot subbands. If the wireless channel is relatively static over the two OFDM symbols, then responses 734 and 738 may be small and the vector $\hat{h}_{N_{Peff}}$ is an accurate full impulse response estimate of the wireless channel.

The full channel impulse response estimate $\hat{h}_{N_{Peff}}$ may be used in various manners to obtain the final frequency response estimate $\hat{H}_{N_F}$. All or some of the taps in $\hat{h}_{N_{Peff}}$ may be selected for use, and zero or more of the taps may be set to zero (i.e., zeroed out) to suppress noise. Several tap selection schemes are described below.

Figure 8A:
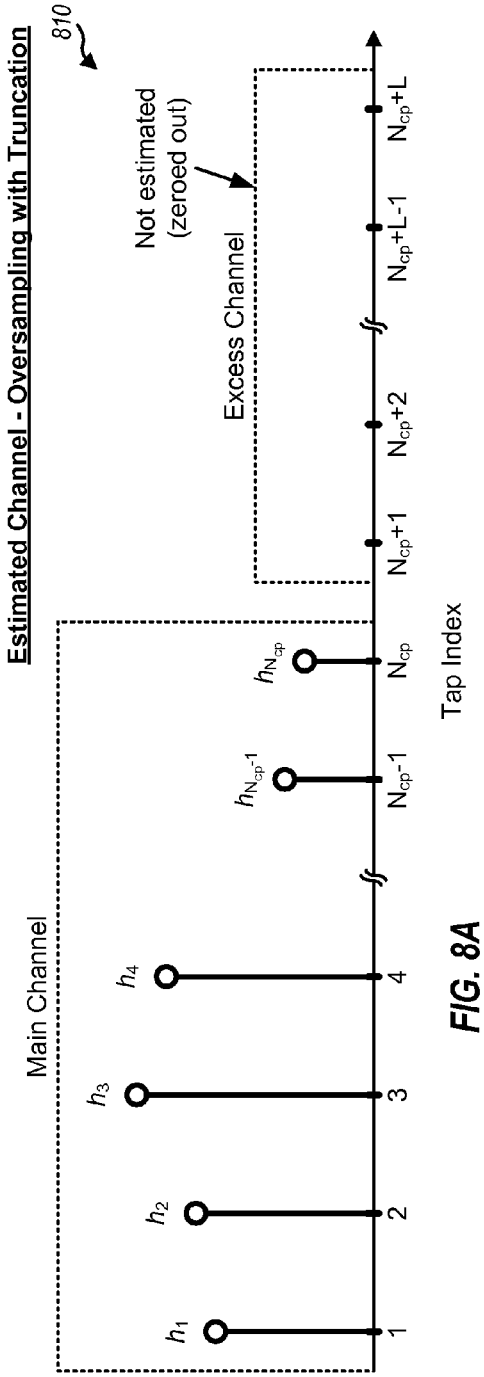
FIG. 8A shows an estimated channel with oversampling and truncation.

FIG. 8A shows an impulse response 810 for an estimated channel for a first tap selection scheme. For this scheme, the first $N_{cp}$ taps (for the main channel) of the full channel impulse response estimate $\hat{h}_{N_{Peff}}$ are used and the last $N_{Peff}-N_{cp}$ taps (for the excess channel) are set to zero (i.e., truncated). Estimated channel impulse response 810 thus suffers a truncation effect since the excess channel response has been zeroed out. However, impulse response 810 does not experience wrap around effect. The channel estimation error for this tap selection scheme is determined by the excess channel and may be expressed as:

$$H_{err,tr}(k) = H_{ex}(k), \text{ for } k=1 \ldots N_F. \qquad \text{Eq (13)}$$

The channel estimation error noise power for this scheme is on the order of the excess channel energy and is approximately half of the noise power for the critically-sampled case shown in equation (11). For the first tap selection scheme, the truncation effect presents a noise floor for SNR but the wrap around effect is not present and does not affect the noise floor. Thus, the noise floor for the first tap selection scheme is lower than that for the critically-sampled case.

The first tap selection scheme also provides an "oversampling gain", which is a reduction in noise resulting from zeroing out some of the taps. Since the last $N_{Peff}-N_{cp}$ taps are set to zero, they do not introduce any noise and do not degrade the final frequency response estimate $\hat{H}_{N_F}$. If $N_{Peff}=2N_{cp}$ and the last $N_{cp}$ taps are zeroed out, then the noise is reduced by approximately 3 dB over the critically-sampled case.

Figure 8B:
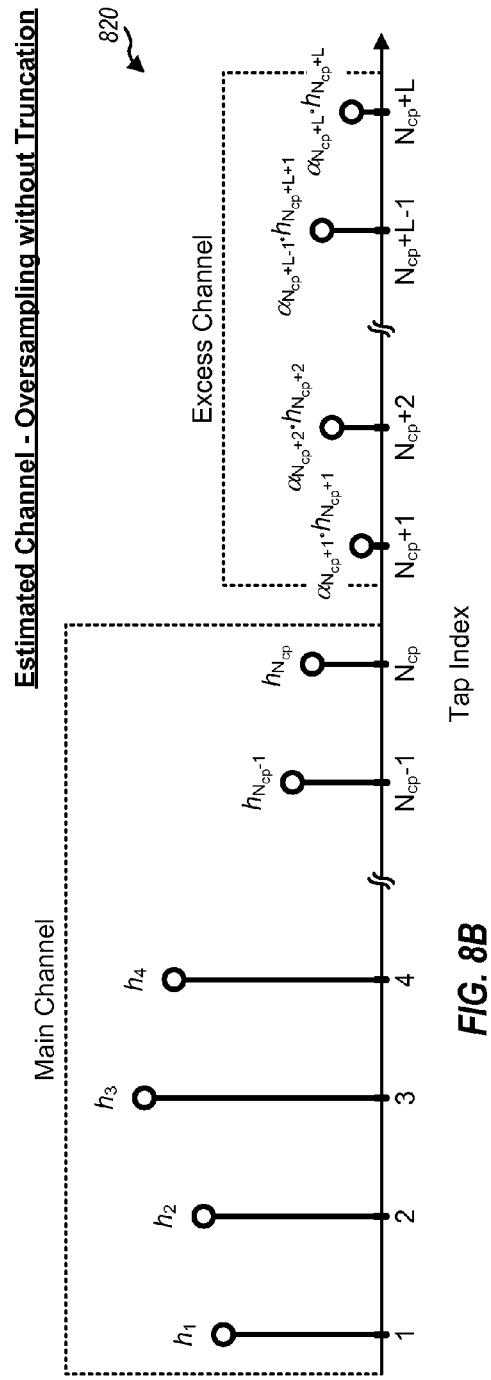
FIG. 8B shows an estimated channel with oversampling and no truncation.

FIG. 8B shows an impulse response 820 for an estimated channel for a second tap selection scheme. For this scheme, all $N_{Peff}$ taps for the full channel impulse response estimate $\hat{h}_{N_{Peff}}$ are used. Estimated channel impulse response 820 does not experience truncation effect or wrap around effect since the excess channel response is properly estimated with a sufficient number of pilot subbands. As a result, the channel estimation error noise power for this scheme is approximately zero and the SNR does not observe a noise floor due to these two effects. However, since all $N_{Peff}$ taps are used, no reduction in noise (i.e., no oversampling gain) is achieved over the critically-sampled case.

Table 1 summarizes the effects observed for the critical sampling and oversampling cases. A 'yes' in the Truncate column indicates that the last $N_{Peff}-N_{cp}$ taps of the full channel impulse response estimate $\hat{h}_{N_{Peff}}$ are set to zero, and a 'no' indicates that all $N_{Peff}$ taps are used.

TABLE 1

| Sampling | Truncate | Wrap Around Effect | Truncation Effect | Oversampling Gain |
|---|---|---|---|---|
| Critical Sampling ($N_{Peff}=N_{cp}$) | — | Yes | Yes | No |
| Oversampling ($N_{Peff}>N_{cp}$) | Yes | No | Yes | Yes |
| | No | No | No | No |

The first and second tap selection schemes select taps in a deterministic manner. The tap selection may also be performed in other manners, some of which are described below.

In a third tap selection scheme, "thresholding" is used to select channel taps with sufficient energy and to zero out channel taps with low energy. Channel taps with low energy are likely due to noise rather than signal energy. A threshold may be used to determine whether or not a given channel tap has sufficient energy and should be retained. The threshold may be computed based on various factors and in various manners. The threshold may be a relative value (i.e., dependent on the measured channel response) or an absolute value (i.e., not dependent on the measured channel response). A relative threshold may be computed based on the (e.g., total or average) energy of the channel impulse response estimate. The use of the relative threshold ensures that (1) the thresholding is not dependent on variations in the received energy and (2) the channel taps that are present but having low signal energy are not zeroed out. An absolute threshold may be computed based on the noise at the receiver, the lowest energy expected for the received pilot symbols, and so on. The use of the absolute threshold forces the channel taps to meet some minimum value in order to be selected for use. The threshold may also be computed based on a combination of factors used for relative and absolute thresholds. For example, the threshold may be computed based on the energy of the channel impulse response estimate and further constrained to be equal to or greater than a predetermined minimum value.

The thresholding may be performed in various manners. In one thresholding scheme, the thresholding is performed after the truncation of the last $N_{Peff}-N_{cp}$ taps and may be expressed as:

$$\hat{h}_i = \begin{cases} 0 & \text{for } |\hat{h}_i|^2 < E_{th}, \\ \hat{h}_i & \text{otherwise} \end{cases} \text{for } i = 1 \ldots N_{cp}, \quad \text{Eq (14)}$$

where $\hat{h}_i$ is the i-th element/tap in $\hat{h}_{N_{Peff}}$;

$|\hat{h}_i|^2$ is the energy of the i-th tap;

$E_{th}$ is the threshold used to zero out low energy taps.

The threshold may be defined, for example, based on the energy of the $N_{cp}$ taps for the main channel as follows: $E_{th}=\alpha_{th} \cdot \|\hat{h}_{N_{Peff}}\|^2$, where $\|\hat{h}_{N_{Peff}}\|^2$ is the main channel energy (after truncation) and $\alpha_{th}$ is a coefficient. The coefficient $\alpha_{th}$ may be selected based on a trade off between noise suppression and signal deletion. A higher value for $\alpha_{th}$ provides more noise suppression but also increases the likelihood of a low energy tap being zeroed out. The coefficient $\alpha_{th}$ may be a value within a range of 0 to $1/N_{cp}$ (e.g., $\alpha_{th}=0.1/N_{cp}$).

In another thresholding scheme, the thresholding is performed on all $N_{Peff}$ elements of $\hat{h}_{N_{Peff}}$ (i.e., without truncation) using a single threshold, similar to that shown in equation (14). In yet another thresholding scheme, the thresholding is performed on all $N_{Peff}$ elements of $\hat{h}_{N_{Peff}}$ using multiple thresholds. For example, a first threshold may be used for the first $N_{cp}$ taps in $\hat{h}_{N_{Peff}}$ for the main channel, and a second threshold may be used for the last $N_{Peff}-N_{cp}$ taps in $\hat{h}_{N_{Peff}}$ for the excess channel. The second threshold may be set lower than the first threshold. In yet another thresholding scheme, the thresholding is performed on only the last $N_{Peff}-N_{cp}$ taps in $\hat{h}_{N_{Peff}}$ and not on the first $N_{cp}$ taps. The thresholding may be performed in other manners, and this is within the scope of the invention.

Thresholding is well suited for a wireless channel that is "sparse", such as a wireless channel in a macro-cellular broadcast system. A sparse wireless channel has much of the channel energy concentrated in a few taps. Each tap corresponds to a resolvable signal path with a different propagation delay. A sparse channel includes few signal paths even though the delay spread (i.e., time difference) between these signal paths may be large. The taps corresponding to weak or non-existing signal paths can be zeroed out.

It can be shown that system performance may be improved significantly by oversampling with $N_{Peff}>N_{cp}$. Oversampling in combination with truncation of the last $N_{Peff}-N_{cp}$ taps provides (1) a lower noise floor in SNR because the wrap around effect is not present and (2) noise reduction due to oversampling gain. Oversampling without truncation removes the noise floor due to wrap around and truncation effects but does not provide oversampling gain. Oversampling in combination with thresholding (with or without truncation) can provide further improvement in certain scenarios. Truncation and/or thresholding may also be disabled or enabled based on the detected delay spread. For example, if the excess delay spread condition is detected (e.g., by performing correlation on the received chips), then truncation may be disabled and thresholding may be enabled or disabled. In any case, oversampling allows the receiver to obtain the full channel impulse response estimate, which can provide a more accurate channel estimate and improve system performance. In general, the amount of improvement with oversampling increases as the amount of energy in the excess channel increases.

FIG. 5 shows an exemplary staggered pilot transmission scheme with two sets of interlaced pilot subbands. Various other pilot transmission schemes may also be used to obtain the necessary effective number of pilot subbands for oversampling.

Figure 9A:
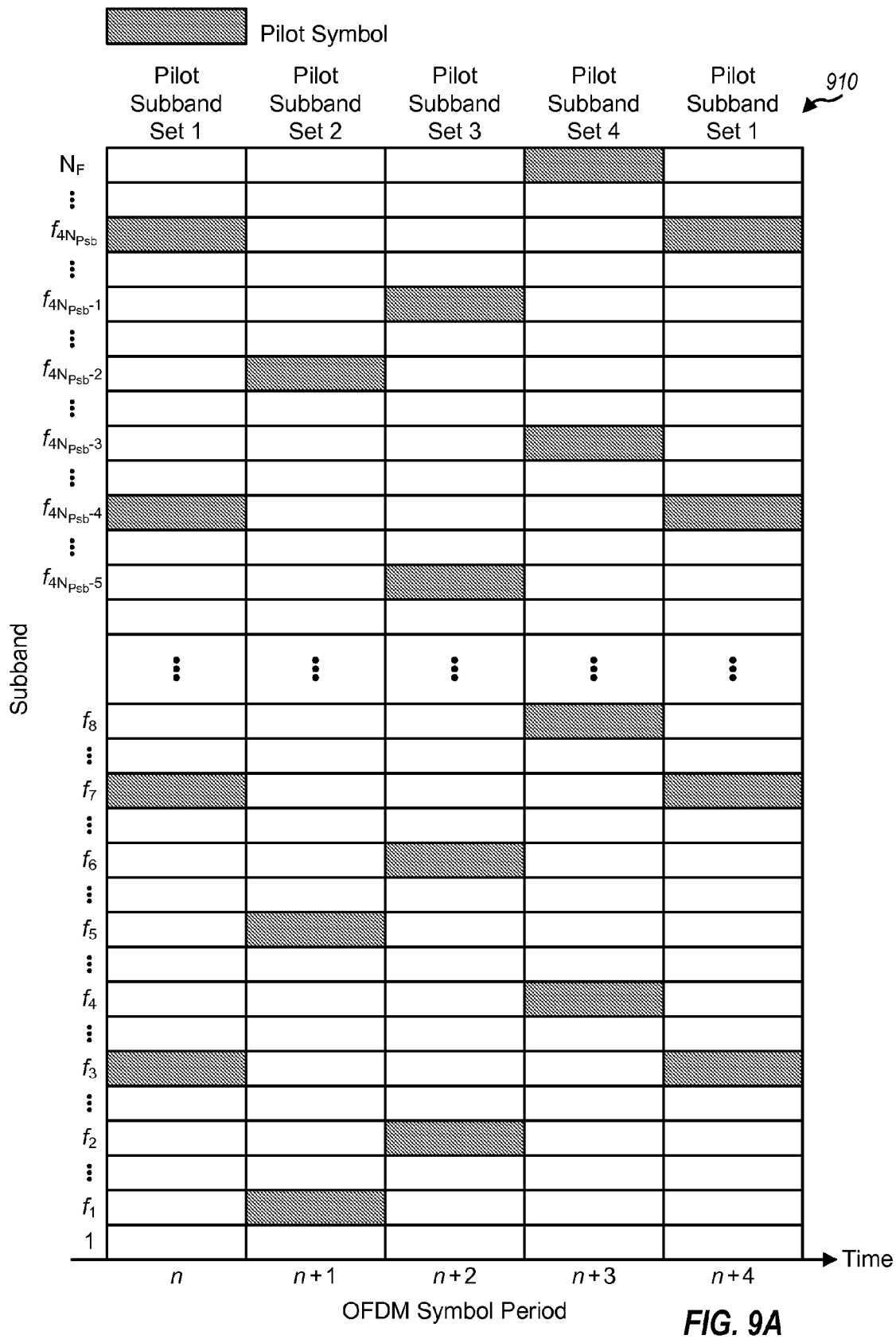

FIG. 9A shows a staggered pilot transmission scheme 910 with four different sets of pilot subbands. Each of the four sets includes $N_{Psb}$ pilot subbands. To simplify computation, $N_{Psb}$ may be selected to be a power of two, and the $N_{Psb}$ pilot subbands in each set may be uniformly distributed across the $N_F$ total subbands such that consecutive pilot subbands in each set are spaced apart by $N_F/N_{Psb}$ subbands. For example, $N_{Psb}$ may be equal to $N_{cp}$, $N_{cp}/2$, and so on. The pilot subbands in the four sets are also interlaced in a comb-like structure, as shown in FIG. 9A. The four pilot subband sets are used in four OFDM symbol periods, for example, in the order shown in FIG. 9A or in a different order.

The received pilot symbols for the four sets of pilot subbands may be used in various manners for channel estimation. A channel impulse response estimate of length $N_{Psb}$, $2N_{Psb}$, or $4N_{Psb}$ may be obtained based on the received pilot symbols for these four pilot subband sets. A channel impulse response estimate of length $N_{Peff}=2N_{Psb}$ may be obtained by (1) performing an $N_{Psb}$-point IFFT on the $N_{Psb}$ received pilot symbols for each OFDM symbol period to obtain an impulse response estimate $\hat{h}_{N_{Psb}}$ of length $N_{Psb}$, (2) repeating the impulse response estimate $\hat{h}_{N_{Psb}}$ once and adjusting the phase of each instance of $\hat{h}_{N_{Psb}}$ as necessary to obtain a vector $\hat{h}'_{2N_{Psb}}$, and (3) updating the full channel impulse response estimate $\hat{h}_{N_{Peff}}$ with the vector $\hat{h}'_{2N_{Psb}}$. A channel impulse response estimate of length $N_{Peff}=4N_{Psb}$ may be obtained by (1) performing an $N_{Psb}$-point IFFT on the $N_{Psb}$ received pilot symbols for each OFDM symbol period to obtain the impulse response estimate $\hat{h}_{N_{Psb}}$, (2) repeating the impulse response estimate $\hat{h}_{N_{Psb}}$ three times and adjusting the phases of each instance of $\hat{h}_{N_{Psb}}$ as necessary to obtain a vector $\hat{h}_{4N_{Psb}}$, and (3) updating the full channel impulse response estimate $\hat{h}_{N_{Peff}}$ with the vector $\hat{h}'_{4N_{Psb}}$. The phase adjustment is dependent on the number of pilot subband sets and the pilot subbands in each set.

Figure 9B:
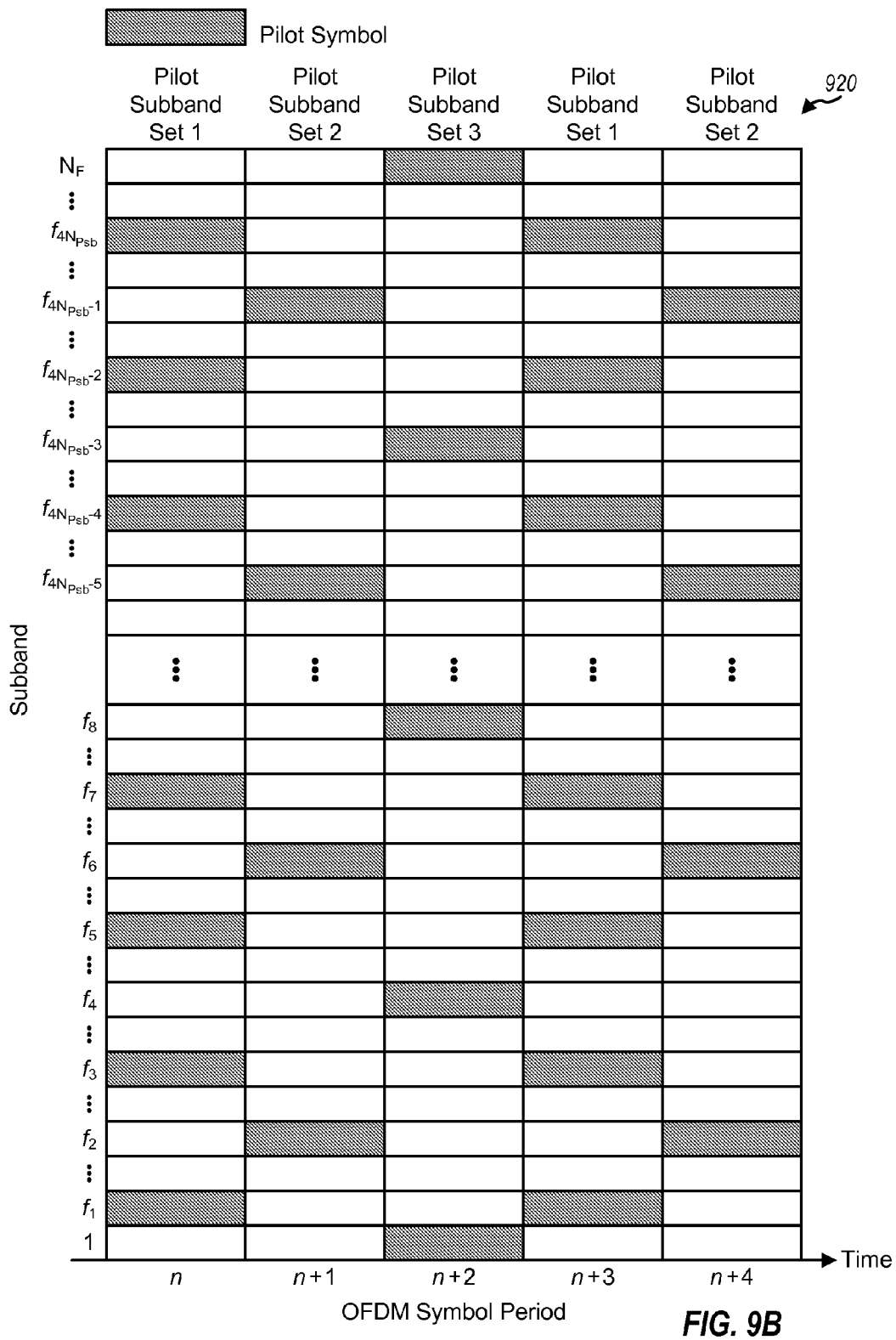

FIG. 9B shows a staggered pilot transmission scheme 920 with three different sets of pilot subbands. The first set includes $2N_{Psb}$ pilot subbands, and the second and third sets each include $N_{Psb}$ pilot subbands. To simplify computation, $N_{Psb}$ may be selected to be a power of two, and the $N_{Psb}$ or $2N_{Psb}$ pilot subbands in each set may be uniformly distributed across the $N_F$ total subbands. The pilot subbands in the three sets are also interlaced in a comb-like structure, as shown in FIG. 9B. The three pilot subband sets may be used in three OFDM symbol periods, for example, in the order shown in FIG. 9B or in a different order.

In general, a staggered pilot transmission scheme uses different sets of pilot subbands for different OFDM symbol periods, and the effective number of pilot subbands is equal to the number of different subbands used for pilot transmission. Any number of pilot subband sets (or repetitions) may be used. A higher repetition generally corresponds to a higher effective number of pilot subbands and also a longer channel estimation delay. Furthermore, any number of pilot subbands may be used for each set, and the sets may include the same or different numbers of subbands. It may be advantageous to cycle through and transmit pilot symbols on as many of the $N_F$ total subbands as possible. However, only a small number of (e.g., $N_{cp}$) subbands are used in each OFDM symbol period in order to reduce pilot overhead.

Figure 10:
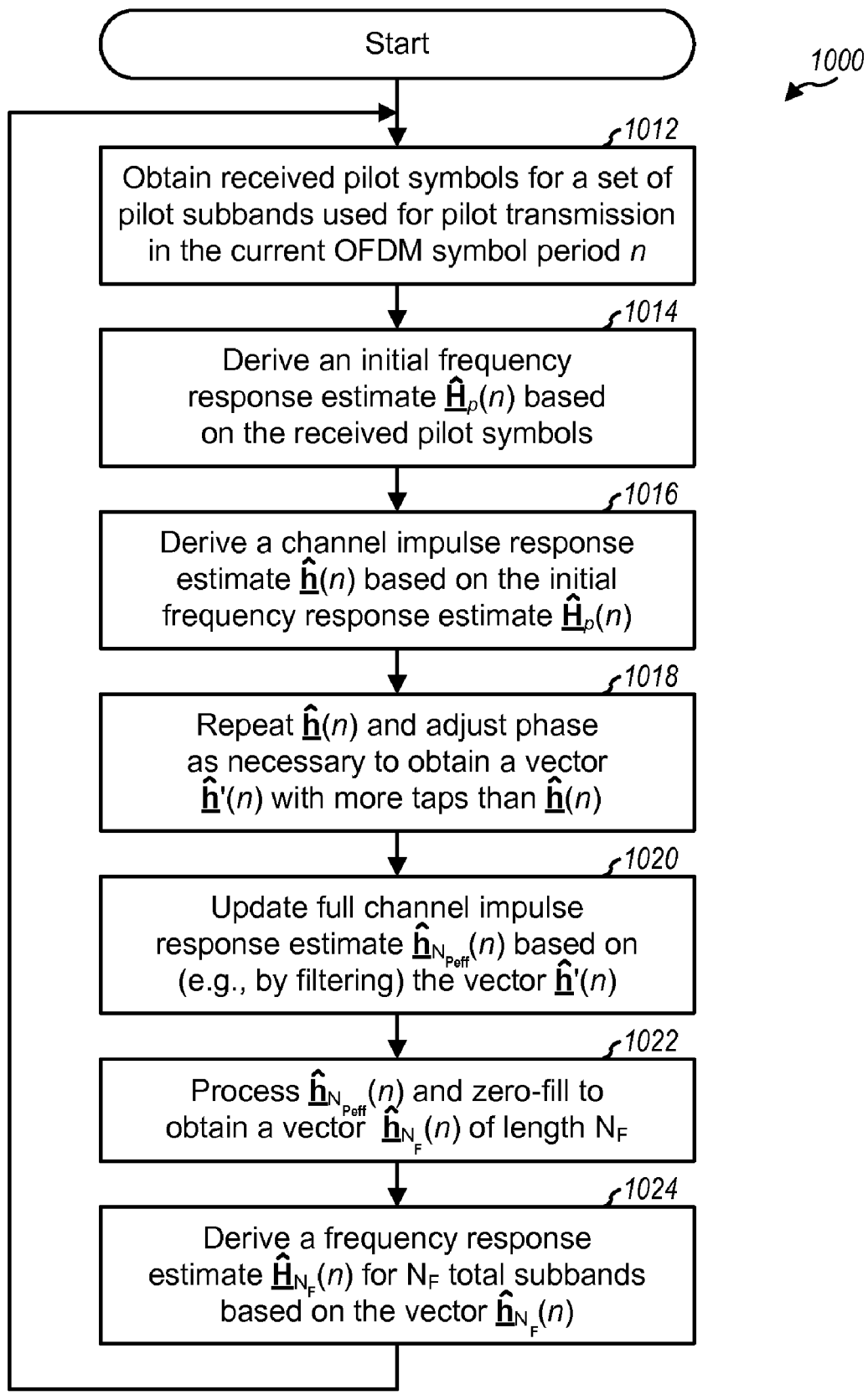
FIG. 10 shows a process for performing channel estimation for a given staggered pilot transmission scheme.

FIG. 10 shows a process 1000 for performing channel estimation for a given staggered pilot transmission scheme. Initially, a group of received pilot symbols is obtained for a set of pilot subbands used for pilot transmission in the current OFDM symbol period n (block 1012). An initial frequency response estimate $\hat{H}_p(n)$ is derived for these pilot subbands based on the received pilot symbols (block 1014). An initial channel impulse response estimate $\hat{h}(n)$ is then derived based on (e.g., by performing an IFFT on) the initial frequency response estimate $\hat{H}_p(n)$ (block 1016). The initial channel impulse response estimate $\hat{h}(n)$ is repeated once or possibly more times (block 1018). Each instance of $\hat{h}(n)$ is appropriately adjusted, for example, in phase based on the particular pilot subbands used in the current OFDM symbol period n (also block 1018). The output of block 1018 is an extended channel impulse response estimate $\hat{h}'(n)$ with more taps than $\hat{h}(n)$.

The full channel impulse response estimate $\hat{h}_{N_{Peff}}(n)$ for the current OFDM symbol period n is then updated based on $\hat{h}'(n)$ (block 1020). The updating of $\hat{h}_{N_{Peff}}(n)$ may be performed in various manners depending on (1) the staggered pilot transmission scheme selected for use, (2) whether or not filtering is performed, and (3) possibly other factors. For example, if filtering is not performed and pilot transmission scheme 500 shown in FIG. 5 is used, then $\hat{h}_{N_{Peff}}(n)$ may be set to $\hat{h}'(n)$ for an odd-numbered OFDM symbol period and computed as $\hat{h}_{N_{Peff}}(n)=[\hat{h}_{N_{Peff}}(n-1)+\hat{h}'(n)]/2$ for an even-numbered OFDM symbol period. Filtering of $\hat{h}'(n)$ to obtain $\hat{h}_{N_{Peff}}(n)$ is described below. The full channel impulse response estimate $\hat{h}_{N_{Peff}}(n)$ may further be processed (e.g., truncated, threshold, and so on) and zero-filled to obtain a vector $\hat{h}_{N_F}(n)$ of length $N_F$ (block 1022). A final frequency response estimate $\hat{H}_{N_F}(n)$ for the current OFDM symbol period n is then derived based on the channel impulse response estimate $\hat{h}_{N_F}(n)$ (block 1024). Blocks 1012 through 1024 may be performed for each OFDM symbol period or whenever pilot symbols are received.

As noted above, the full channel impulse response estimate $\hat{h}_{N_{Peff}}(n)$ may be obtained by filtering $\hat{h}'(n)$. For example, $\hat{h}_{N_{Peff}}(n)$ may be obtained with a FIR filter as follows:

$$\hat{h}_{N_{Peff}}(n) = \sum_{i=-L_1}^{L_2} c_i \cdot \hat{h}'(n-i),$$  Eq (15)

where $c_i$ is a vector with $N_{Peff}$ coefficients for FIR filter tap i; and
$L_1$ and $L_2$ are the time extents of the FIR filter.

For a causal FIR filter, $L_1=0$, $L_2 \geq 1$, and the filtered frequency response estimate $\hat{h}_{N_{Peff}}(n)$ is a weighted sum of the extended channel impulse response estimates $\hat{h}'(n)$ for $L_2$ prior and the current OFDM symbol periods. For a non-causal FIR filter, $L_1 \geq 1$, $L_2 \geq 1$, and the filtered frequency response estimate $\hat{h}_{N_{Peff}}(n)$ is a weighted sum of the extended channel impulse response estimates $\hat{h}'(n)$ for $L_2$ prior, the current, and $L_1$ future OFDM symbol periods. Buffering of $L_1$ received OFDM symbols is needed to implement the non-causal FIR filter.

The coefficients for the FIR filter may be selected in various manners. The $L_1+L_2+1$ vectors $c_i$ for the $L_1+L_2+1$ taps of the FIR filter are selected to obtain the desired filtering characteristics (e.g., filter bandwidth and roll-off). The $N_{Peff}$ coefficients for each vector $c_i$ may also be selected in various manners. In one embodiment, the $N_{Peff}$ coefficients in the vector $c_i$ for each FIR filter tap are all set to the same value. In another embodiment, the first $N_{cp}$ coefficients (for the main channel) in the vector $c_i$ for each FIR filter tap are set to one value, and the remaining $N_{Peff}-N_{cp}$ coefficients are set to another value. In general, equal or different weights may be used for the $N_{Peff}$ coefficients in each vector $c_i$.

The full channel impulse response estimate $\hat{h}_{N_{Peff}}(n)$ may also be obtained with an IIR filter as follows:

$$\hat{h}_{N_{Peff}}(n)=(1-\alpha_t) \cdot \hat{h}_{N_{Peff}}(n-1)+\alpha_t \cdot \hat{h}'(n),$$  Eq (16)

where $\alpha_t$ is a time constant for the filtering. The time constant $\alpha_t$ may be selected based on the characteristics (e.g., coherence time) of the wireless channel.

The initial frequency response estimate $\hat{H}_p(n)$ and/or the final frequency response estimate $\hat{H}_{N_F}(n)$ may also be filtered to obtain higher quality.

The final frequency response estimate $\hat{H}_{N_F}(n)$ may be used for detection to recover the transmitted data symbols. The received symbol for each subband may be expressed as:

$$Y(k)=\sqrt{E_s} \cdot \hat{H}(k) \cdot S(k)+N(k), \text{ for } k=1 \ldots N_F,$$  Eq (17)

where $S(k)$ is the transmit symbol for subband k;
$\hat{H}(k)$ is the channel gain estimate for subband k;
$N(k)$ is the noise observed for subband k; and
$Y(k)$ is the received symbol for subband k.

The detection may be performed as follows:

$$\hat{S}(k) = \frac{Y(k)}{\hat{H}(k)} = S(k) + N'(k), \text{ for } k \in K_d,$$  Eq (18)

where $\hat{S}(k)$ is a detected symbol on subband k;
$N'(k)$ is the post-processed noise on subband k; and
$K_d$ is a set of subbands used for data transmission (i.e., the data subbands).

The operation in equation (18) is commonly referred to as equalization and is typically used for an uncoded system. Alternatively, the detection may be performed as:

$$\hat{S}(k)=Y(k)\hat{H}^*(k)=S(k)+N''(k), \text{ for } k \in K_d,$$  Eq (19)

where "*" denotes the complex conjugate. The operation in equation (19) is commonly referred to as matched filtering and is typically used for a coded system.

Figure 11:
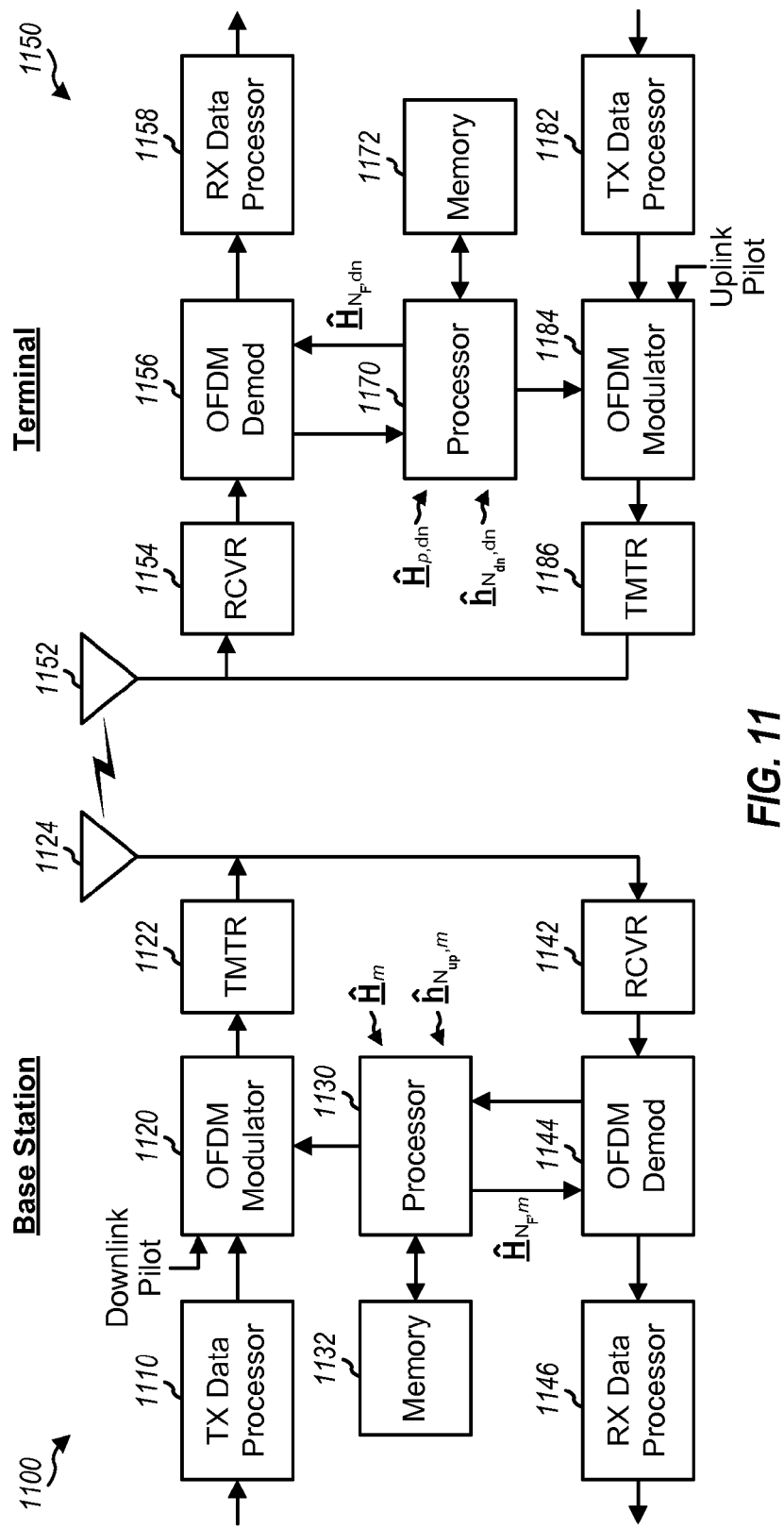
FIG. 11 shows an access point and a terminal in the OFDM system.

FIG. 11 shows a block diagram of an access point 1100 and a terminal 1150 in the OFDM system. On the downlink, at access point 1100, a transmit (TX) data processor 1110 receives, formats, codes, interleaves, and modulates (i.e., symbol maps) traffic data and provides modulation symbols (or simply, "data symbols"). An OFDM modulator 1120 receives the data symbols and pilot symbols, performs OFDM modulation as described for FIG. 1, and provides a stream of OFDM symbols. Pilot symbols are transmitted in a manner such that the effective number of pilot subbands is greater than the cyclic prefix length (i.e., $N_{P_{eff}} > N_{cp}$) to achieve oversampling. A transmitter unit (TMTR) 1122 receives and converts the stream of OFDM symbols into one or more analog signals, conditions (e.g., amplifies, filters, and frequency upconverts) the analog signals to generate a downlink signal, and transmits the signal via an antenna 1124 to the terminals.

At terminal 1150, an antenna 1152 receives the downlink signal and provides a received signal to a receiver unit (RCVR) 1154. Receiver unit 1154 conditions (e.g., filters, amplifies, and frequency downconverts) the received signal, digitizes the conditioned signal, and provides received chips to an OFDM demodulator 1156.

Figure 12:
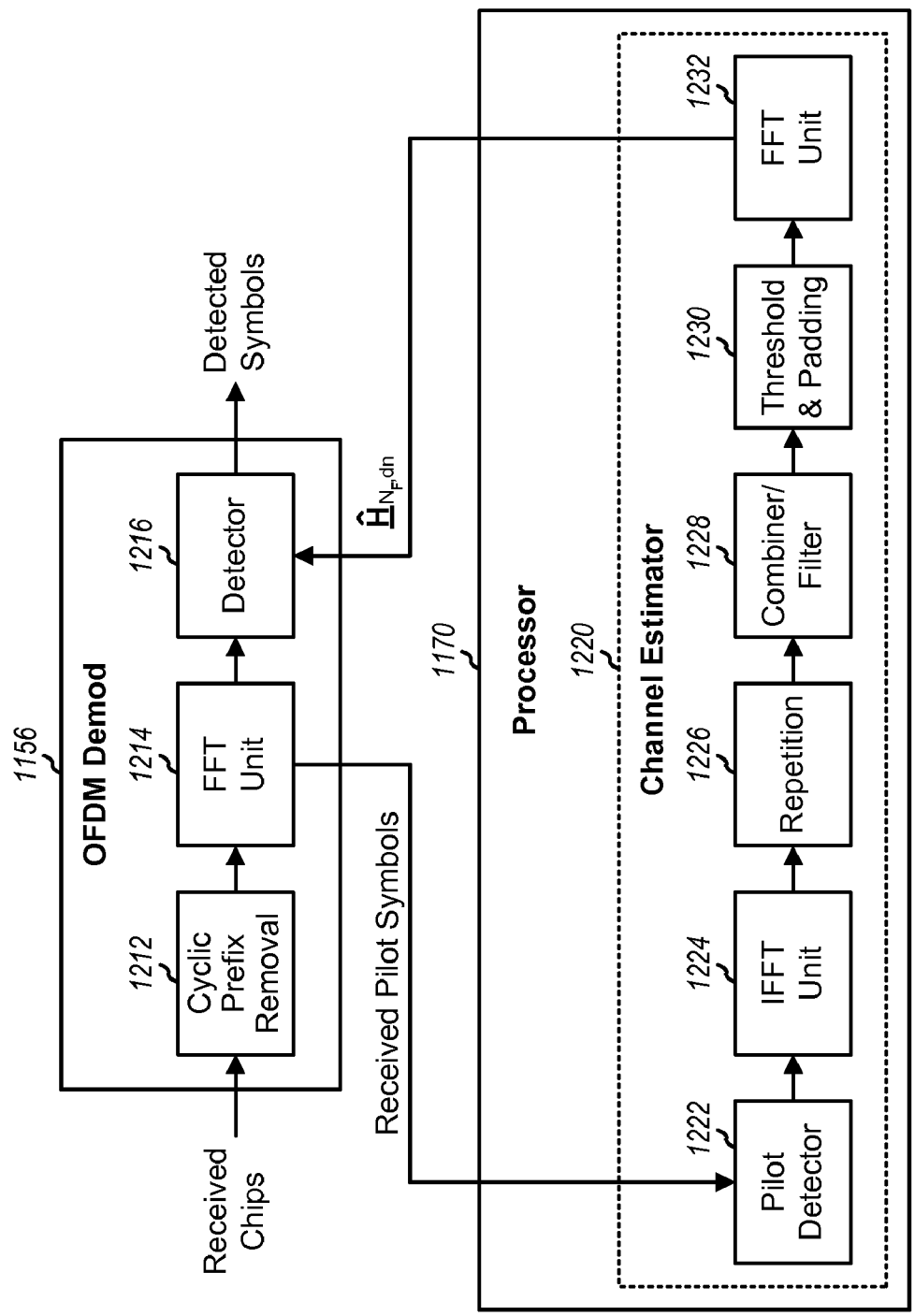
FIG. 12 shows a channel estimator.

FIG. 12 shows an embodiment of OFDM demodulator 1156. A cyclic prefix removal unit 1212 removes the cyclic prefix appended to each OFDM symbol. An FFT unit 1214 then transforms each received transformed symbol to the frequency domain using an $N_F$-point FFT and obtains $N_F$ received symbols for the $N_F$ subbands. FFT unit 1214 provides received pilot symbols to a processor 1170 and received data symbols to a detector 1216. Detector 1216 further receives a frequency response estimate $\hat{H}_{N_F,dn}$ for the downlink from processor 1170, performs detection on the received data symbols to obtain detected symbols (which are estimates of the transmitted data symbols), and provides the detected symbols to an RX data processor 1158.

Processor 1170 includes a channel estimator 1220 that obtains the received pilot symbols and performs channel estimation as described above. Within channel estimator 1220, a pilot detector 1222 removes the modulation on the received pilot symbols and may perform extrapolation and/or interpolation as necessary to obtain an initial frequency response estimate $\hat{H}_{p,dn}$ with channel gain estimates for $N_{dn}$ uniformly distributed subbands in each OFDM symbol period. An IFFT unit 1224 performs an IFFT on the initial frequency response estimate to obtain a channel impulse response estimate $\hat{h}_{N_{dn},dn}$ with $N_{dn}$ taps. A repetition unit 1226 repeats the channel impulse response estimate as many times as necessary and further adjusts the phase of each instance if needed. A combiner/filter 1228 then either combines or filters the output of unit 1226 and provides a full channel impulse response estimate. A threshold and zero-padding unit 1230 performs thresholding (if enabled) and zero-padding to obtain a vector $\hat{h}_{N_F,dn}$ with $N_F$ taps. An FFT unit 1232 then performs an FFT on the vector $\hat{h}_{N_F,dn}$ to obtain the final frequency response estimate $\hat{H}_{N_F,dn}$ for the $N_F$ subbands for the downlink.

Referring back to FIG. 11, RX data processor 1158 demodulates (i.e., symbol demaps), deinterleaves, and decodes the detected symbols to recover the transmitted traffic data. The processing by OFDM demodulator 1156 and RX data processor 1158 is complementary to the processing by OFDM modulator 1120 and TX data processor 1110, respectively, at access point 1100.

On the uplink, a TX data processor 1182 processes traffic data and provides data symbols. An OFDM modulator 1184 receives and multiplexes the data symbols with pilot symbols, performs OFDM modulation, and provides a stream of OFDM symbols. The pilot symbols may be transmitted on $N_{up}$ subbands that have been assigned to terminal 1150 for pilot transmission. The number of pilot subbands ($N_{up}$) for the uplink may be the same or different from the number of pilot subbands ($N_{dn}$) for the downlink. Moreover, the same or different (e.g., staggering) pilot transmission schemes may be used for the downlink and uplink. A transmitter unit 1186 then receives and processes the stream of OFDM symbols to generate an uplink signal, which is transmitted via an antenna 1152 to the access point.

At access point 1100, the uplink signal from terminal 1150 is received by antenna 1124 and processed by a receiver unit 1142 to obtain received chips. An OFDM demodulator 1144 then processes the received chips and provides received pilot symbols and detected symbols for the uplink. An RX data processor 1146 processes the detected symbols to recover the traffic data transmitted by terminal 1150.

Processor 1130 performs channel estimation for each terminal transmitting on the uplink, as described above. Multiple terminals may transmit pilot concurrently on the uplink on their assigned pilot subbands. To reduce interference, each subband may be used for pilot or data transmission by only one terminal in a given OFDM symbol period. Processor 1130 may implement channel estimator 1220 shown in FIG. 12. For each terminal m, processor 1130 obtains an initial frequency response estimate $\hat{H}_m$ for the uplink for the terminal based on pilot symbols received from the terminal, derives a channel impulse response estimate $\hat{h}_{N_{up},m}$ for the terminal based on $\hat{H}_m$, and derives a final frequency response estimate $\hat{H}_{N_F,m}$ for the terminal based on $\hat{h}_{N_{up},m}$. The frequency response estimate $\hat{H}_{N_F,m}$ for each terminal is provided to OFDM demodulator 1144 and used for detection for that terminal.

Processors 1130 and 1170 direct the operation at access point 1100 and terminal 1150, respectively. Memory units 1132 and 1172 store program codes and data used by processors 1130 and 1170, respectively. Processors 1130 and 1170 also perform channel estimation as described above.

For clarity, the pilot transmission and channel estimation techniques have been described for an OFDM system. These techniques may be used for other multi-carrier modulation techniques such as discrete multi tone (DMT).

The pilot transmission and channel estimation techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the pilot transmission and channel estimation techniques may be implemented with modules (e.g., procedures, functions, and so on) that perform the functions described herein. The software codes may be stored in a memory unit (e.g., memory units 1132 and 1172 in FIG. 11) and executed by a processor (e.g., processors 1130 and 1170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for mitigating intersymbol interference and channel estimation errors in a wireless communication system, comprising:
    transmitting a first set of pilot subbands in a first symbol period; and
    transmitting a second set of pilot subbands in a second symbol period,
    wherein the first set of pilot subbands and the second set of pilot subbands are staggered in frequency, and the number of pilot subbands selected are greater than a cyclic prefix length ($N_{Peff} > N_{cp}$) to achieve over sampling in the frequency domain.

2. The method of claim 1, wherein the first set of pilot subbands and the second set of pilot subbands include an equal number of pilot subbands.

3. The method of claim 1, wherein the first set of pilot subbands and the second set of pilot subbands include different numbers of pilot subbands.

4. The method of claim 1, wherein the wireless communication system utilizes discrete multi tone (DMT).

5. The method of claim 1, further comprising:
    transmitting a third set of pilot subbands in a third symbol period,
    wherein the third set of pilot subbands, the first set of pilot subbands and the second set of pilot subbands are staggered in frequency.

6. An apparatus for mitigating intersymbol interference and channel estimation errors in a wireless communication system, comprising:
    at least one processor configured to transmit a first set of pilot subbands in a first symbol period, and to transmit a second set of pilot subbands in a second symbol period,
    wherein the first set of pilot subbands and the second set of pilot subbands are staggered in frequency, and
    wherein the number of pilot subbands selected are greater than a cyclic prefix length ($N_{Peff} > N_{cp}$) to achieve over-sampling in the frequency domain; and
    a memory coupled to the at least one processor.

7. The apparatus of claim 6, wherein the first set of pilot subbands and the second set of pilot subbands include an equal number of pilot subbands.

8. The apparatus of claim 6, wherein the first set of pilot subbands and the second set of pilot subbands include different numbers of pilot subbands.

9. The apparatus of claim 6, wherein the wireless communication system utilizes discrete multi tone (DMT).

10. The apparatus of claim 6, wherein the at least one processor is further configured to transmit a third set of pilot subbands in a third symbol period, wherein the third set of pilot subbands, the first set of pilot subbands and the second set of pilot subbands are staggered in frequency.

11. An apparatus for mitigating intersymbol interference and channel estimation errors in a wireless communication system, comprising:
    means for transmitting a first set of pilot subbands in a first symbol period; and
    means for transmitting a second set of pilot subbands in a second symbol period,
    wherein the first set of pilot subbands and the second set of pilot subbands are staggered in frequency, and the number of pilot subbands selected are greater than a cyclic prefix length ($N_{Peff} > N_{cp}$) to achieve oversampling in the frequency domain.

12. The apparatus of claim 11, wherein the first set of pilot subbands and the second set of pilot subbands include an equal number of pilot subbands.

13. The apparatus of claim 11, wherein the first set of pilot subbands and the second set of pilot subbands include different numbers of pilot subbands.

14. The apparatus of claim 11, wherein the wireless communication system utilizes discrete multi tone (DMT).

15. The apparatus of claim 11, further comprising:
    means for transmitting a third set of pilot subbands, in a third symbol period,
    wherein the third set of pilot subbands, the first set of pilot subbands and the second set of pilot subbands are staggered in frequency.

16. A computer program product, comprising a computer readable medium, for mitigating intersymbol interference and channel estimation errors in a wireless communication system, comprising:
    code for causing at least one computer to transmit a first set of pilot subbands in a first symbol period, and
    code for causing the at least one computer to transmit a second set of pilot subbands in a second symbol period,
    wherein the first set of pilot subbands and the second set of pilots subbands are staggered in frequency, and the number of pilot subbands selected are greater than a cyclic prefix length ($N_{Peff} > N_{cp}$) to achieve oversampling in the frequency domain.

17. The computer program product of claim 16, wherein the first set of pilot subbands and the second set of pilot subbands include an equal number of pilot subbands.

18. The computer program product of claim 16, wherein the first set of pilot subbands and the second set of pilot subbands include different numbers of pilot subbands.

19. The computer program product of claim 16, wherein the wireless communication system utilizes discrete multi tone (DMT).

20. The computer program product of claim 16, wherein the computer-readable medium further comprises:
    code for causing the at least one computer to transmit a third set of pilot subbands in a third symbol period,
    wherein the third set of pilot subbands, the first set of pilot subbands and the second set of pilot subbands are staggered in frequency.

21. A method for mitigating intersymbol interference and channel estimation errors in a wireless communication system, comprising:
    receiving a first set of pilot subbands in a first symbol period; and
    receiving a second set of pilot subbands in a second symbol period,
    wherein the first set of pilot subbands and the second set of pilot subbands are staggered in frequency, and the number of pilot subbands selected are greater than a cyclic prefix length ($N_{Peff} > N_{cp}$) to achieve oversampling in the frequency domain.

22. The method of claim 21, wherein the first set of pilot subbands and the second set of pilot subbands include an equal number of pilot subbands.

23. The method of claim 21, wherein the first set of pilot subbands and the second set of pilot subbands include different numbers of pilot subbands.

24. The method of claim 21, wherein the wireless communication system utilizes discrete multi tone (DMT).

25. The method of claim 21, further comprising:
receiving a third set of pilot subbands in a third symbol period, wherein the third set of pilot subbands, the first set of pilot subbands and the second set of pilot subbands are staggered in frequency.

26. An apparatus for mitigating intersymbol interference and channel estimation errors in a wireless communication system, comprising:
at least one processor configured to receive a first set of pilot subbands in a first symbol period, and tp receive a second set of pilot subbands in a second symbol period, wherein the first set of pilot subbands and the second set of pilot subbands are staggered in frequency, and wherein the number of pilot subbands selected are greater than a cyclic prefix length ($N_{Peff} > N_{cp}$) to achieve oversampling in the frequency domain; and
a memory coupled to the at least one processor.

27. The apparatus of claim 26, wherein the first set of pilot subbands and the second set of pilot subbands include an equal number of pilot subbands.

28. The apparatus of claim 26, wherein the first set of pilot subbands and the second set of pilot subbands include different numbers of pilot subbands.

29. The apparatus of claim 26, wherein the wireless communication system utilizes discrete multi tone (DMT).

30. The apparatus of claim 26, wherein the at least one processor is further configured to receive a third set of pilot subbands in a third symbol period, wherein the third set of pilot subbands, the first set of pilot subbands and the second set of pilot subbands are staggered in frequency.

31. An apparatus for mitigating intersymbol interference and channel estimation errors in a wireless communication system, comprising:
means for receiving a first set of pilot subbands in a first symbol period; and
means for receiving a second set of pilot subbands in a second symbol period,
wherein the first set of pilot subbands and the second set of pilot subbands are staggered in frequency, and the number of pilot subbands selected are greater than a cyclic prefix length ($N_{Peff} > N_{cp}$) to achieve oversampling in the frequency domain.

32. The apparatus of claim 31, wherein the first set of pilot subbands and the second set of pilot subbands include an equal number of pilot subbands.

33. The apparatus of claim 31, wherein the first set of pilot subbands and the second set of pilot subbands include different numbers of pilot subbands.

* * * * *